US012628259B2

(12) United States Patent
Bertken

(10) Patent No.: US 12,628,259 B2
(45) **Date of Patent: *May 12, 2026**

(54) MULTIMODE LIGHTING SYSTEM

(71) Applicant: Infinity X1 LLC, Carlsbad, CA (US)

(72) Inventor: Dennis K. Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/229,738

(22) Filed: Jun. 5, 2025

(65) Prior Publication Data

US 2026/0013020 A1 Jan. 8, 2026

Related U.S. Application Data

(63) Continuation of application No. 18/765,297, filed on Jul. 7, 2024, now Pat. No. 12,356,527.

(51) Int. Cl.

| | |
|---|---|
| ***H05B 47/17*** | (2020.01) |
| ***F21L 4/00*** | (2006.01) |
| ***H05B 45/12*** | (2020.01) |
| ***H05B 45/18*** | (2020.01) |
| ***H05B 45/56*** | (2020.01) |
| ***H05B 45/58*** | (2020.01) |
| *F21Y 115/10* | (2016.01) |

(52) U.S. Cl.

CPC .............. *H05B 47/17* (2020.01); *F21L 4/005* (2013.01); *H05B 45/12* (2020.01); *H05B 45/18* (2020.01); *H05B 45/56* (2020.01); *H05B 45/58* (2020.01); *F21Y 2115/10* (2016.08)

(58) Field of Classification Search

CPC ........ H05B 47/17; H05B 45/12; H05B 45/18; H05B 45/56; H05B 45/58; F21L 4/005; F21Y 2115/10

See application file for complete search history.

(56) References Cited

U.S. PATENT DOCUMENTS

| | | | | |
|---|---|---|---|---|
| 10,939,522 | B1 * | 3/2021 | Mischel, Jr. | H05B 47/19 |
| 11,109,471 | B1 * | 8/2021 | Recker | H02J 9/02 |
| 11,778,706 | B1 * | 10/2023 | Mischel, Jr. | H05B 45/20 315/297 |

(Continued)

FOREIGN PATENT DOCUMENTS

| | | |
|---|---|---|
| CN | 109416168 A | 3/2019 |
| EP | 2451253 A2 | 5/2012 |

*Primary Examiner* — Abdullah A Riyami
*Assistant Examiner* — Syed M Kaiser
(74) *Attorney, Agent, or Firm* — Wang Hardoon, P.C.

(57) ABSTRACT

A multimode lighting system is disclosed. Due to industry standards, manufacturers of lighting devices are incentivized to create high initial light outputs that drop off quickly. Portable lighting devices with multiple modes of operation that can maximize light output and runtime according to industry standards (e.g., FL-1) as well as other lighting modes with more consistent light output over the device runtime. Lighting modes may be adjusted automatically based on sensor input. In an extreme mode, light output may be adjusted based on the temperature of the lights. Automatic modes may be adjusted based on ambient lighting or distance to a target. Lifecycle adjustments may be made to output current levels to obtain consistent light output throughout the lifecycle of lights by adjusting lighting based on accumulated usage.

20 Claims, 8 Drawing Sheets

(56) References Cited

U.S. PATENT DOCUMENTS

| | | | | |
|---|---|---|---|---|
| 12,356,527 | B1 * | 7/2025 | Bertken | H05B 45/58 |
| 2006/0022214 | A1 * | 2/2006 | Morgan | H05B 45/40 257/E25.032 |
| 2009/0167571 | A1 * | 7/2009 | Loo | H01H 19/585 341/35 |
| 2015/0035437 | A1 * | 2/2015 | Panopoulos | B60L 53/12 315/291 |
| 2021/0120652 | A1 | 4/2021 | Kuta et al. | |
| 2022/0201823 | A1 | 6/2022 | Kuta et al. | |

* cited by examiner

MULTIMODE LIGHTING SYSTEM

PRIORITY

This application is a continuation of, and claims the benefit of priority to, U.S. patent application Ser. No. 18/765,297 filed Jul. 7, 2024 and entitled "MULTIMODE LIGHTING SYSTEM", the foregoing incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of lighting systems. More particularly, the present disclosure relates to a multimode lighting system.

DESCRIPTION OF RELATED TECHNOLOGY

Prior to the promulgation of the ANSI-PLATO FL-1 standard (formerly called the ANSI-NEMA FL1 Standard) in 2009, each flashlight manufacturer used different standards, testing methods, and language to describe the performance of their flashlights. As a result, comparing flashlights in the marketplace was a difficult task for consumers. Around this time, with the growth of light emitting diode (LED) technology came a marketplace flooded inferior LED flashlights with misrepresented performance claims. Industry leaders who were committed to quality and accuracy decided to work together to formulate a scientifically based standard which would help provide clarity and accountability to the industry as a whole.

The ANSI-PLATO FL-1 standard lays out a series of basic flashlight tests and minimal performance criteria for flashlights. For example, the FL-1 standard allows consumers to compare light output across flashlights with lumen values rather than trying to compare watt, candlepower, and LED Flux values. Standardized icons were provided to allow manufacturers to highlight and consumers to easily compare these standard flashlight features.

The FL-1 specification calls for test and measurement criteria for the following: beam distance, light output, impact resistance, run time, water resistance, waterproof capability, submersible capability, and peak beam intensity. Beam Distance is measured in meters and defined as the distance from the light where illuminance is equal to a full moon on a clear night. Light output is measured in lumens and is a measurement of energy. Impact resistance is measured in meters and is tested by dropping the light onto a concrete surface with all accessories and batteries installed, from a specified height. Run time, measured in hours, measures the amount of time until the flashlight's output drops below 10%. Tests are conducted with the same batteries as come with the unit, or with the batteries suggested by the manufacturer to be used with the product. Water resistance is represented by an ingress protection (IP) rating.

Peak beam intensity is measured in candelas and is a measurement of the intensity at the center of the flashlight beam.

The promulgation of the FL-1 standard however has not been a panacea for flashlight consumers. The portable lighting industry is driven by marketing high lumen values on products. This has created incentives to game the FL-1 Standard in ways that do not accurately convey light output performance to consumers. Additionally, inconsistent mode labels (e.g., turbo, high, medium, low, ultra-low) add to consumer confusion of what each product is offering. And while the icons in the FL-1 standard allow consumers a means of product comparison, the user interfaces on the products are inconsistent making it difficult for users to get the full benefit of the product purchased.

DETAILED DESCRIPTION

Figure 1:
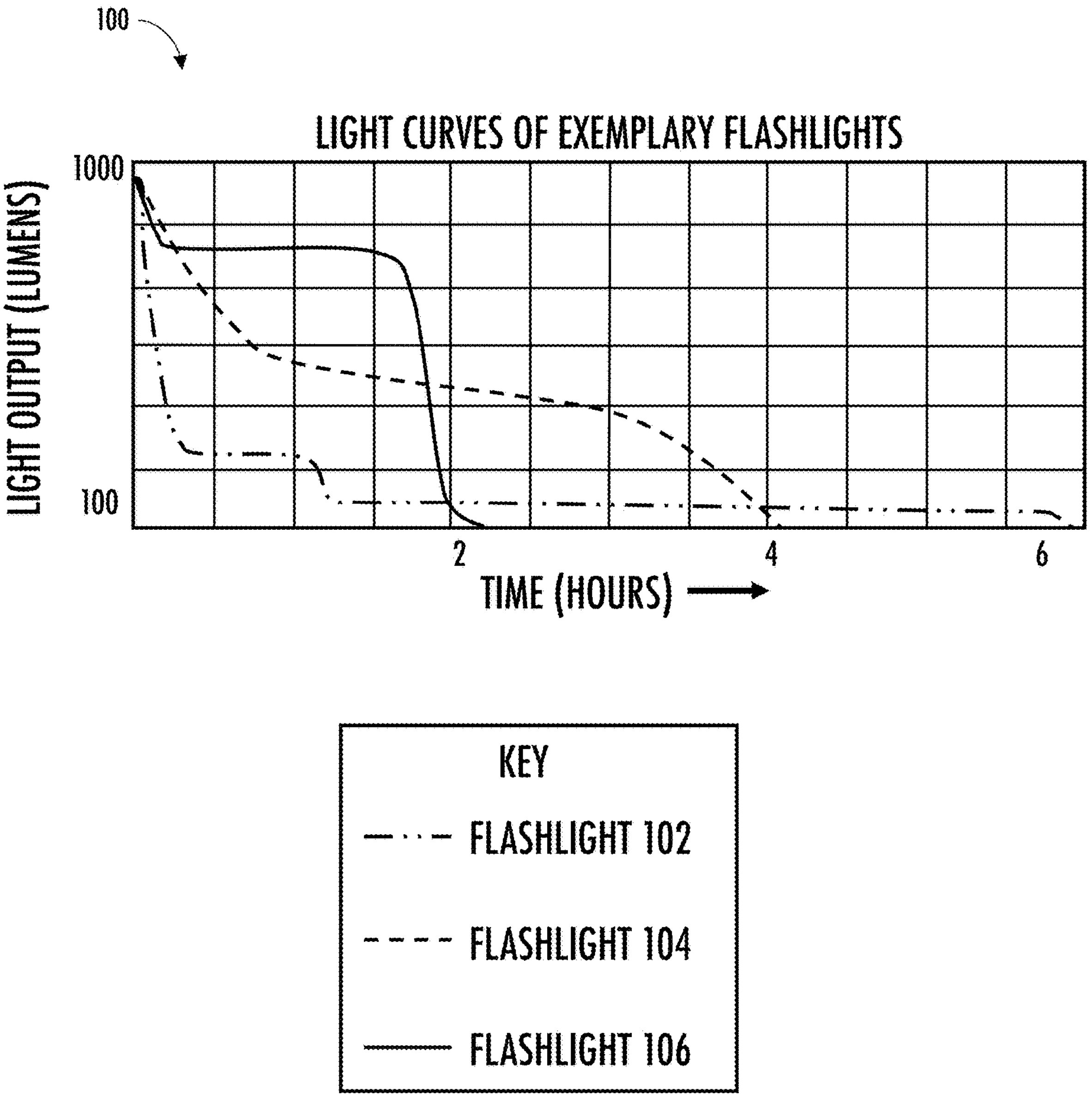
FIG. 1 is a graph of three light curves illustrating the light output over time of three exemplary flashlights.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

For purposes of the description hereinafter, it is to be understood that the specific articles, compositions, and/or processes described herein are exemplary and should not be considered as limiting. In the description, relative terms such as "lower," "upper," "horizontal," "vertical,", "above," "below," "up," "down," "top," "bottom," "underside," "front," "rear," and "side" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

1 Light Output and Runtime in the FL-1 Standard

Luminous flux is the measure of the perceived power of visible light emitted by a source. The perceived power includes energy within the range of frequencies humans perceive as light. The unit of luminous flux is the lumen. Lumens are measurement unit describing the total amount of light emitted from the lighting product (e.g., a flashlight, headlamp, etc.). The lumen output may be tested using a spectroradiometer with an integrating sphere system. According to the FL-1 standard, a flashlight manufacturer can advertise the light output with the lumens measured between 30 and 120 seconds from when the lighting product is turned on.

Runtime is the time the time elapsed from when the lighting product is powered on until power remaining is below a threshold value, the lighting device produces less than a threshold amount of output (an absolute value or as a percentage of a standard light output), or until the lighting device powers off. According to the FL-1 standard, runtime is measured from when the lighting product is powered on until the lumen output drops to (or below) 10% of the lumen value measured at 30 seconds, measured at 15-minute intervals.

Unfortunately, knowing how many lumens a lighting product emits after 30 seconds and for how long the lighting product can run until the lumen output drops below 10% does not provide a consumer an understanding of how the lighting product performs between these endpoints. The standard also allows manufacturers to manipulate advertised lumen output values by producing high 30-second values and then dropping the light output to a fraction, above 10%, of the advertised 30-second value to maximize runtime.

One way of representing a fuller picture of light output of a lighting device is a light curve, a graph illustrating lumen values over the runtime of the lighting device. FIG. 1 is a graph 100 of three light curves illustrating the light output over time of three exemplary flashlights. As shown, flashlight 102 is turned on and has a light output at 1000 lumens. After less than half an hour of runtime, the light output drops quickly to about 300 lumens. At around an hour of runtime, the light output of flashlight 102 drops again to around 180 lumens where it slowly decreases until around 6 hours of runtime the light output crosses below the 100 lumens (10% of the initial 1000 lumen light output).

Flashlight 104 is turned on and has a light output at 1000 lumens. The light output drops slowly over the course of 4 hours. At approximately 4 hours of runtime, the light output crosses below the 10% threshold. Flashlight 102 is turned on and has a light output at 1000 lumens. After slowly dropping, the light output plateaus at approximately 700 lumens where it remains until dropping precipitously at around one and a half hours of runtime until around 2 hours of runtime when the light output crosses below the 10% threshold.

Each of flashlight 102, flashlight 104, and flashlight 106 may claim a 1000 lumen light output under the FL-1 standard. Flashlight 102 can claim a runtime of 6 hours, flashlight 4 can claim a runtime of 4 hours, and flashlight 102 can claim a runtime of 2 hours under the FL-1 standard. The consumer experience of each of these flashlights 102, 104, and 106 may vary greatly. For example, a user that uses a flashlight for short few minute bursts (and therefore may turn off the flashlight before a big drop in light output) may not experience any difference between the flashlights 102, 104, and 106. A user, however, that needs a high and steady light output for hours of work or exercise might not be satisfied with the precipitous falloff of light output and then hours of relatively low light output of flashlight 102 and would be more satisfied with a shorter runtime of flashlights 104 or 106.

Unfortunately, a consumer only presented with the light output and runtime values according to the FL-1 standard might think that flashlight 102 is the best overall light since all three flashlights 102, 104, and 106 share the same 1000 lumen light output rating and flashlight 102 has a six-hour runtime. As such, manufacturers of flashlights and other portable lighting devices are incentivized to create high initial light outputs (to maximize the light output rating) that drop off quickly to just above the 10% runtime threshold under the FL-1 to maximize battery life and therefore runtime.

Accordingly, there is a need for portable lighting devices with multiple modes of operation that can maximize light output and runtime as well as provide other modes of operation to allow a user to select an appropriate light output. According to aspects of the present disclosure, a portable lighting device may have high FL-1 ratings (with a high light output and long runtime) while having other lighting modes with more consistent light output over time.

According to aspects of the present disclosure, a multi-mode portable lighting device is disclosed. Various modes of operation of the portable lighting device may include modes designed to represent various uses of the portable lighting device. Other lighting modes may include light output characteristics useful for maximizing light output and runtime according to the FL-1 standard.

Additional lighting modes may be configured to adjust the light produced by the portable lighting device based on external data. Sensors on or in communication with the portable lighting device can determine conditions both internal to and external of the portable lighting device. For example, in an automatic mode, light output may be adjusted based on the proximity to a target device. A proximity/ distance sensor may be used to determine a lighting target and light output may be based on the target's distance from the portable lighting device. Ambient light sensors may be used to determine the amount of available light, and the portable lighting device in an automatic mode may output greater light in brighter (e.g., daylight) conditions and less light in dimmer (e.g., nighttime) conditions. A temperature sensor on the portable lighting device may be used to determine the temperature of a lamp (e.g., an LED) on the portable lighting device. Certain modes may adjust light output based on the temperature detected (compared with a threshold temperature value). For example, the portable lighting device may attempt to maintain a relatively high light output but adjust the lighting mode to a lower output level based on temperature of the LED/portable lighting device.

2 Lighting Modes

Figure 2:
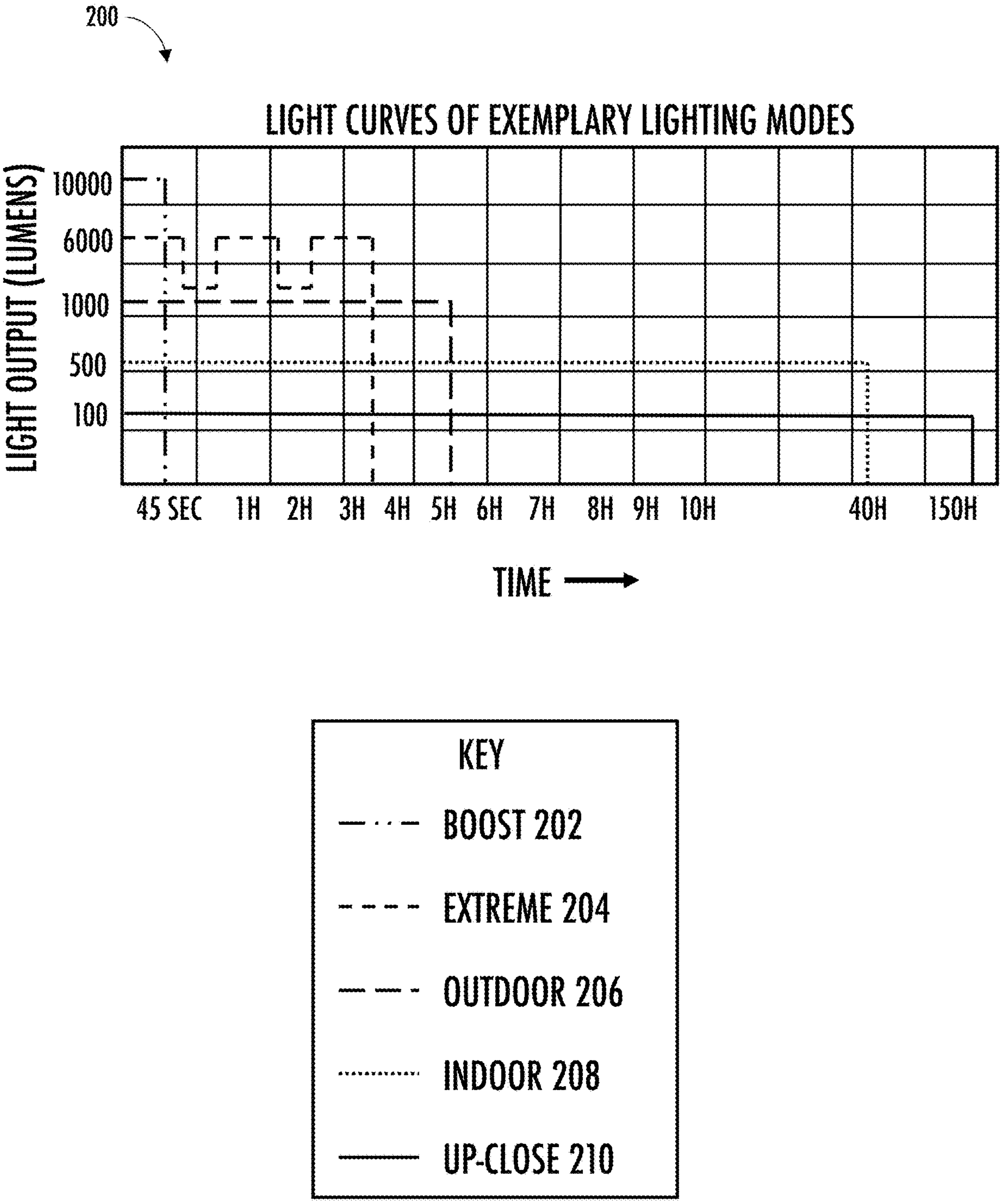
FIG. 2 is a graph of light curves illustrating the light output over time of exemplary lighting modes of a portable lighting device, according to aspects of the present disclosure.

FIG. 2 is a graph 200 of light curves illustrating the light output over time of exemplary lighting modes of a portable lighting device. In some examples, a portable lighting device may include one or more constant lighting modes. As shown, the constant lighting modes include boost lighting mode 202, outdoor lighting mode 206, indoor lighting mode 208, and up-close lighting mode 210. In a constant lighting mode, a controller on the portable lighting device may attempt to achieve a relatively stable light output over time. Light output in a constant lighting mode may fall off relatively quickly when the power source of the portable lighting device is nearly depleted. The stable light output of a constant lighting mode may be beneficial to a user that needs consistent lighting particularly over longer time periods rather than in use cases where a dimming light is acceptable. Consistent lighting across lighting devices may better empower users to find the best portable lighting device to meet their needs. In some examples, the constant lighting modes may have pre-set or standardized light outputs such that portable lighting devices may be compared based on the runtime of these standardized constant light modes. In other examples, multiple portable lighting devices may be set to the same (or different/coordinated) lighting modes to achieve a particular lighting effect. Standardized light outputs may enable users to more easily comply with particular lighting restrictions (e.g., time or location-based restrictions).

As used herein, a constant lighting mode is a lighting mode that produces light output within a certain (e.g., 10%) threshold of an initial or advertised output. This output level may be maintained for the majority (e.g., 50%, 75%, 90%) of the runtime of the lighting device. Thus, constant lighting modes may be characterized by a light output during a majority of the runtime being greater than 90% of the initial light output. Due to current, voltage, and temperature fluctuations that may occur in portable lighting devices when powered on or change modes, initial light output may be the light output at a pre-set period of time (e.g., 15 seconds, 30 seconds, etc.) following power-on or mode adjustment.

In certain examples, constant lighting modes may be regulated by a temperature sensor/thermostat. In these examples, when the temperature of the LED has exceeded a temperature threshold (e.g., 100° C.), the LED may be configured to power off or to output a lower lumen level (e.g., a 50% reduction, etc.) to reduce heat and the potential for damage to the portable lighting device.

The portable lighting device may include a boost lighting mode 202. In one example, the boost lighting mode 202 includes a constant maximum light output for the portable lighting device. The portable lighting mode may output this maximum light output for as long as possible until battery depletion (or a low power state is detected) or until a temperature threshold is exceeded. As shown, the boost lighting mode 202 has a constant 10,000 L output for 45 seconds.

The potential light output of an LED may irreversibly decrease over time (called lumen depreciation); such effects may be exacerbated when LEDs are subjected to high temperature operation. When operating a portable lighting device, heat build-up may be a concern particularly at relatively higher light output levels. Too much heat accumulation may damage the LED chips. At certain light outputs, the heat generated may be too great for continuous operation of the LED due to the relatively lower efficiency of LEDs at higher temperatures and the risk of damage to the LED chip. Said another way, the portable lighting device may be unable to consistently dissipate enough heat at certain lumen outputs to overcome the heat generated by the LED in that mode of operation. If operation of the portable lighting device were to continue unabated, more power would be needed to achieve the high output level (e.g., due to inefficiency of the LED at the higher temperature) and a greater likelihood of irreversible LED failure. Failure may be caused by various factors including proliferating defects in the LED chip, expansion of a transparent epoxy resin surrounding the LED which can result in an LED open circuit, yellowing of the epoxy resin.

In certain lighting modes, when running the LED to create a high lumen output, the heat build-up may be equally high, and the portable lighting device may dim the light output to protect the LED chip. For example, in extreme lighting mode 204, the portable lighting device may be configured to output light at a high output level (e.g., 6000 L). At this output level, the LED may generate more heat than can be dissipated which may cause a temperature increase in the LED. When the temperature of the LED has exceeded a temperature threshold (e.g., 100° C.), the LED may be configured to output a lower lumen level (e.g., 3000 L) to reduce heat and the potential for damage to maintain the robustness of the portable lighting device. The light output may be set to a level where the heat dissipated by the LED is greater than the heat generated by the LED. In some examples, the lower output level is 50% or 30% of the high output level. Once the LED has cooled sufficiently (to below a lower threshold temperature threshold) and/or after a particular period of time elapses (e.g., 5 minutes), the LED may be configured to return to the high lumen output. Such light output modulation may continue until battery depletion (or a low power state is detected).

In some examples, in the extreme lighting mode 204, rather than having a high and low output modes based on temperature, the extreme lighting mode 204 may have three or more light output levels (e.g. 6000 L/4000 L/2000 L) based on the temperature of the LED/portable lighting device. In some examples, the portable lighting device may select light output based on a function that is negatively proportional to the determined temperature.

Outdoor lighting mode 206, indoor lighting mode 208, and up-close lighting mode 210 are exemplary constant lighting modes. In some examples, outdoor lighting mode 206 is characterized by a 1000 L output, indoor lighting mode 208 is characterized by a 500 L output, and the up-close light mode 210 is characterized by a 100 L output. In some examples, outdoor lighting mode has an initial light output of between 800 L and 1200 L, indoor lighting mode has an initial light output of between 450 L and 550 L, and up-close lighting mode has an initial light output of between 90 L and 110 L. When in these modes, the portable lighting device may attempt to consistently produce the indicated light output until battery depletion (or a low power state is detected). As shown, the portable lighting device is able to maintain the outdoor lighting mode 206 for about five hours, the indoor lighting mode 208 for 40 hours, and the up-close lighting mode 210 for 150 hours.

The light output of an LED naturally decreases during its operating lifetime. Thus, the maximum light output of an LED is higher when the LED is new than after many hours of operation. Similarly, as an LED is used over time, the same input current results in a reduced lumen output (a reduced luminous efficiency). In some examples, the portable lighting device may store information about the total runtime of the LED (or the total runtime in each of the various modes). For example, operation in boost lighting mode 202 may impact the deterioration of the LED more than a lower lumen output mode. The portable lighting device may determine an output current to provide to the LED based on the runtime of the LED (and/or the various LED modes) and the desired output mode. This output current may be used to achieve consistent lighting over time for the various constant lighting modes of the portable lighting device. Other factors may also impact the efficiency of the LED including the (p-n junction) temperature of the LED. The portable lighting device may determine the output current based on one or a plurality of factors. These factors may include a combination of stored values over time (e.g., total runtime) and presently sensed values. In some examples, the output current may be determined when the portable lighting device is powered on, when the mode is changed, and/or periodically (e.g., every 5 minutes) during operation.

Other lighting modes may include a runtime mode that periodically lowers the lumen output over the course of the runtime of the device in order to increase the potential runtime for a given initial lumen output. The initial lumen output may a lumen output taken between 30 and 120 seconds from powering on the device or activating the lighting mode. Runtime mode may increase the runtime (e.g., preserve battery life) for a given initial light output, as defined by the FL-1 standard. In the runtime mode, the light output during the majority of the runtime may be less than 90% of the initial light output. In some examples, runtime mode may be an initial or default operating mode of the portable lighting device. In runtime mode, unlike a constant lighting mode, the portable lighting device dims the light output over the course of operation to maintain battery life/increase runtime for a given initial lumen output (such as those shown by the flashlights of FIG. 1). In some examples, a high initial light output is followed relatively quickly by a rapid dimming in light output. For example, rapid dimming may occur within the first few (e.g., 5 or 10) minutes of runtime or within the first 10% or 25% of total (expected) runtime. Some runtime modes may include one or more plateaus where the dimming of light output slows or stops entirely before additional rapid dimming. where Exemplary portable lighting devices may include a preset light output routine based on the current runtime of the portable lighting device.

The portable lighting device may include one or more automatic modes that vary the lumen output of the device based on external factors (to the device). Sensors on the portable lighting device may determine ambient light (via, e.g., an ambient light sensor), proximity to users/targets (via, e.g., a proximity sensor), surrounding motion (via e.g., a motion detector), device motion (via, e.g., an inertial sensor), etc. Some or all of these data may be used by the portable lighting device to determine the light output.

For example, in a first automatic mode light output is proportional to the amount of ambient light. As the amount of ambient light increases, the portable lighting device may increase the light output. As the amount of ambient light decreases, the portable lighting device may decrease the light output/dim the LED. In a second automatic mode, the distance to a target opposite the LED beam (e.g., what a flashlight is pointed at) is determined. As the distance increases to the target, the light output is increased; as the distances to the target decreases, the light output is decreased. The distance to moving objects/users surrounding the portable lighting device may be determined. Where the moving objects are determined to be close to the portable lighting device, the light output may be relatively low/decreased; conversely where the moving objects are determined to be far from the portable lighting device, the light output may be high/increased. In an alternative mode, when moving objects are close the light output may be high/increased and when moving objects are far from the light output may be low/decreased. In a third automatic mode, where the speed of the portable lighting device is high/increasing the light output is high/increased; where the speed of the portable lighting device is low/decreasing the light output may be low/decreased. In some modes, when movement of the portable lighting device is not detected for a particular time period, standby mode is activated which reduces the output power, turns off certain sensors or device functions, or turns off the portable lighting device.

Other automatic modes may be based on the remaining capacity of one or more power source of the device. For example, in a reserve mode, when the remaining battery capacity drops below a threshold (e.g., 10% the initial capacity), the light output may be reduced. This may conserve remaining runtime of the LED or allow the portable lighting device to retain charge to provide power to other devices. Other device modes may include altering the color or color temperature of the LED, strobing/blinking at a selected or preselected intervals, or selecting or modifying the shape of the beam of the light/selecting which light assemblies from a plurality on the portable lighting device.

3 User Interface

Figure 3:
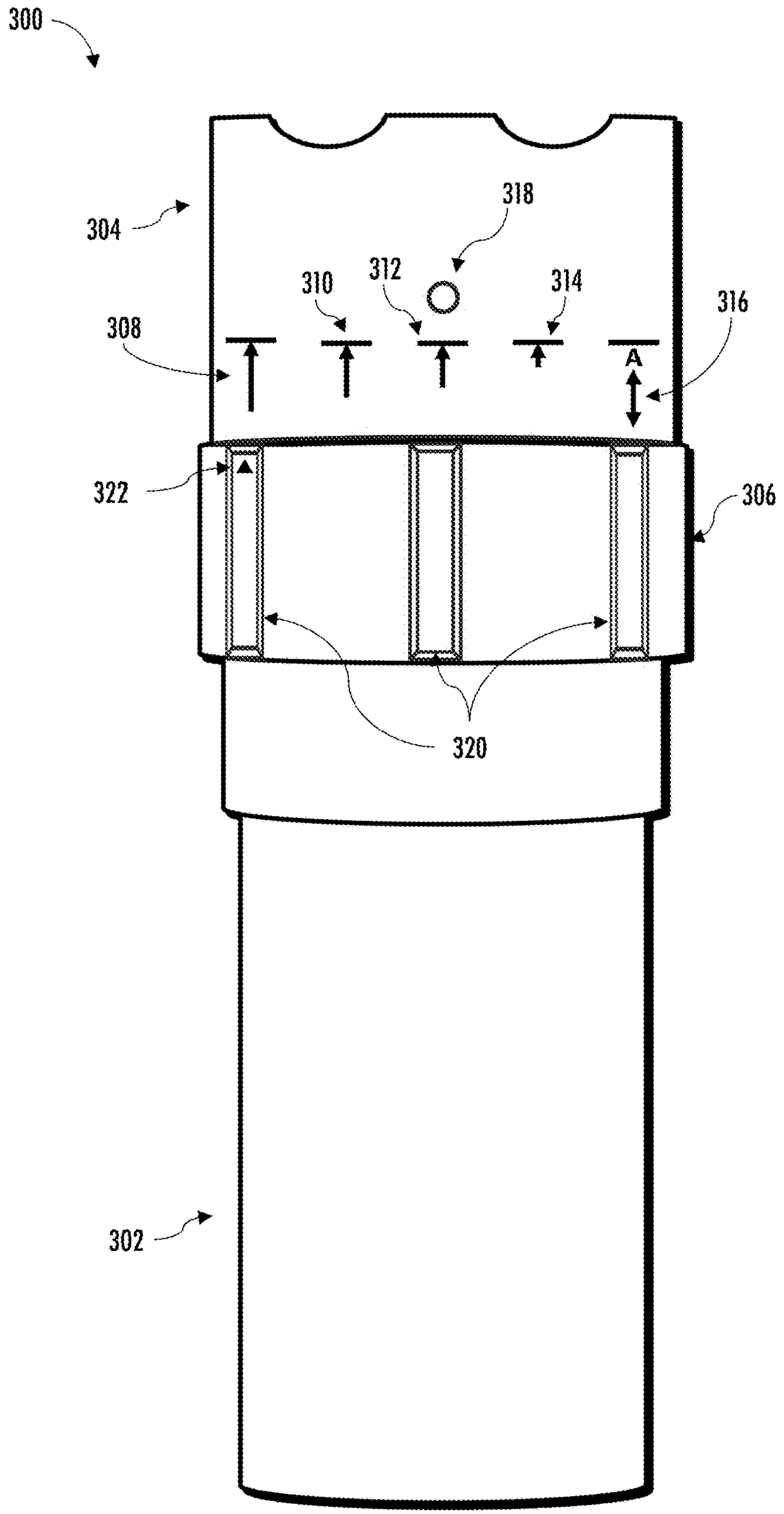
FIG. 3 illustrates a portable lighting device 300 according to aspects of the present disclosure.

The lumen outputs of the various modes may be set/programmed by a user of the portable lighting device. This may allow a user to customize their portable lighting device to their needs. FIG. 3 illustrates a portable lighting device 300 according to aspects of the present disclosure. While the following discussion is presented with reference to an exemplary flashlight, artisans of ordinary skill in the related arts will readily appreciate that the following techniques may be broadly extended to e.g., flashlights, headlamps, lanterns, work lights, and/or any other lighting device having a plurality of operational modes. As illustrated, the portable lighting device 300 is a flashlight with a barrel 302, a head component 304, and a mode dial 306.

The barrel 302 is configured to be grasped by a user and may include ridges, knurling, or other texture along the outer periphery for improved handling during operation. The barrel 302 may also include flat/un-textured/un-ridged portions for a user to comfortable place their thumb when handheld. The barrel 302 of the portable lighting device 300 may house a power source (e.g., a battery) and may include connections to couple charging devices (e.g., a charging port).

The head component 304 may include one or more light-emitting assemblies including a lens, a reflector, and a light emitting diode (LED). The light-emitting assemblies may be used together, or individually, in a variety of different operating modes. The head component 304 may include a bezelled rim around the circumference. The head component 304 may have one or more mode indicator symbols that correspond with one or more selectable operating modes of the portable lighting device 300. As illustrated, the mode indicator symbols include an extreme mode symbol 308 (that, e.g., corresponds to extreme lighting mode 204), an outdoor mode symbol 310 (that, e.g., corresponds to outdoor lighting mode 206), an indoor mode symbol 312 (that, e.g., corresponds to indoor lighting mode 208), an up-close mode symbol 314 (that, e.g., corresponds to up-close lighting mode 210), and an automatic mode symbol 316. Other symbols may include a power symbol (to toggle power to the portable lighting device 300), a boost mode symbol (that, e.g., corresponding to boost lighting mode 202), a runtime mode, etc.

An indicator LED 318 on the head component 304 may indicate the mode/status of the battery/power source of the portable lighting device 300. In one example, each mode corresponds to a different color for the indicator LED 318 to illuminate. For example, the indicator LED 318 may illuminate red when in the extreme lighting mode 204; the indicator LED 318 may illuminate orange when in the outdoor lighting mode 206; the indicator LED 318 may illuminate yellow when in the indoor lighting mode 208; the indicator LED 318 may illuminate green when in the up-close lighting mode 210; and the indicator LED 318 may illuminate blue when in the automatic lighting mode.

The indicator LED 318 may indicate an estimated remaining battery capacity or an estimated remaining runtime at the current duty cycle. The indicator LED 318 may be instructed (or powered) by a controller on the portable lighting device 300. For example, the indicator LED 318 may be solid (not-blinking) when the battery is fully charged through 75% remaining charge; the indicator LED 318 may blink slowly when the battery has between 50% and 75% remaining charge; blink fast and then slow blink when the battery has between 25% and 50% remaining charge; and the indicator LED 318 may have a fast blink when there is below 25% remaining charge in the battery. The indicator LED 318 may be off when the battery has run out of charge or the portable lighting device 300 is powered off.

The mode dial 306 is configured to rotate with respect to the head component 304 and/or the barrel 302. When rotated, the mode dial 306 is configured to change the mode of operation of the portable lighting device 300. In some examples, the mode dial 306 may activate one or more switches/buttons within the portable lighting device 300. Switches (or buttons, other input device) may indicate the position of the mode dial 306 and indicate a user preferred mode of operation. The switches (or other devices) activated/deactivated by the mode dial 306 may provide input to the controller of the portable lighting device 300 to change the mode of operation.

Ridges 320 on the mode dial 306 may provide a textured surface for a user to grip. An indicator arrow 322 (or other shape, color, etc.) may indicate a mode of operation when lined up with mode indicator symbols (e.g., extreme mode symbol 308, outdoor mode symbol 310, indoor mode symbol 312, up-close mode symbol 314, and/or automatic mode symbol 316) on the head component 304. The indicator arrow 322 may be on one of the ridges 320.

In some examples, the portable lighting device 300 includes a button to activate a constant lighting mode or toggle between constant lighting modes. For example, the portable lighting device 300 may be configured to power on with a first button that may also be used to toggle between non-constant/dimming lighting modes. Another button may be configured to toggle constant lighting mode. In some examples, when toggled on, the constant lighting mode may be configured to have the same output as the initial output of the non-constant lighting mode. In other examples, when toggled on, the constant lighting mode may be configured to be set to the lowest (or, alternatively, highest) brightness mode.

In some examples, each mode may be associated with one or more device settings such as a lumen output. The lumen output associated with a particular mode of operation may be user adjustable. The mode dial 306 (in some examples in concert with other input devices/buttons on the portable lighting device 300) may adjust the lumen output associated with a particular mode of operation. By default, the constant lighting modes may be set to a particular lumen amount. The outdoor lighting mode 206 may default to 1000 L output. In some examples, a user may alter the default output of the lighting mode based on their needs or preferences to increase the default light output (to, e.g., 2000 L) or reduce the default light output (to, e.g., 750 L). These custom settings may be saved in memory on the portable lighting device 300 and retrieved by the controller to control the LED based on the lighting mode. Customized settings may allow a user to customize their portable lighting device 300 to their requirements (of the task, environment, etc.). User input (using e.g., the mode dial 306, buttons, etc.) may allow a user to return the portable lighting device 300 to the default settings. In some examples, when the memory associated with the custom settings may be cleared, erased, or overwritten with the default values.

4 System Architecture

Figure 4:
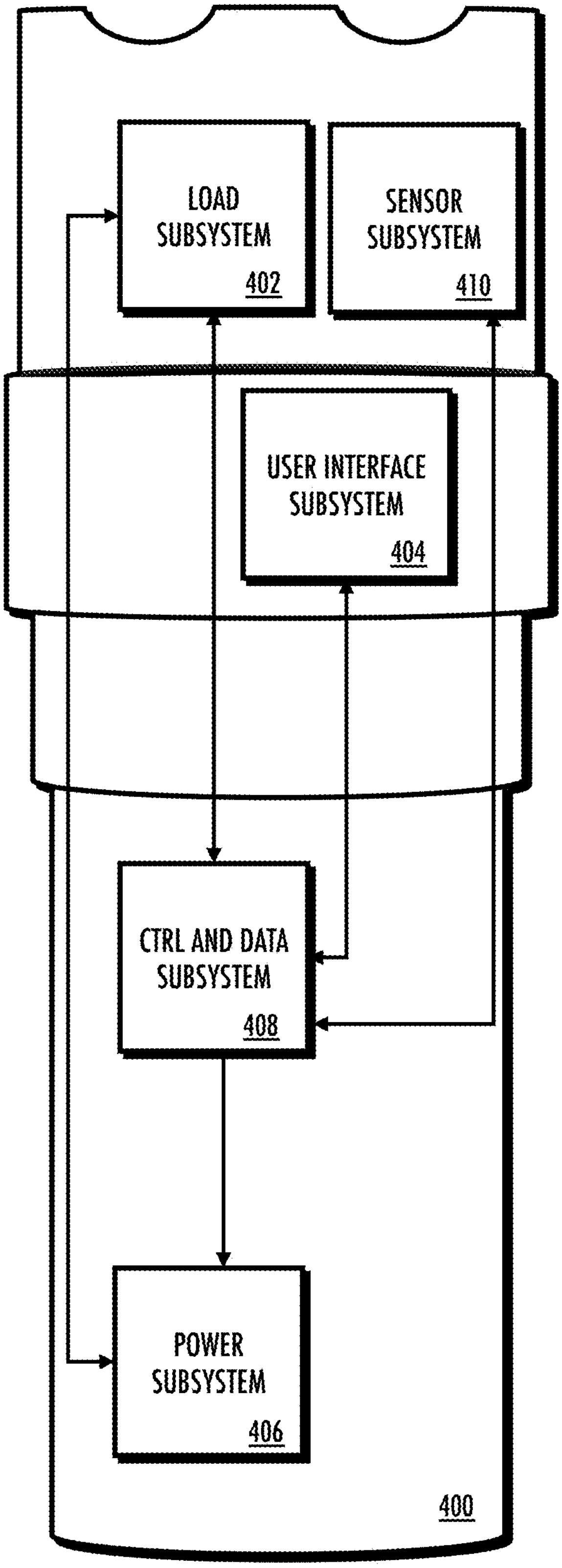
FIG. 4 is a logical block diagram of an exemplary lighting system, useful in conjunction with the various techniques described herein.

FIG. 4 is a logical block diagram of an exemplary lighting system 400. The exemplary lighting system 400 may include a load subsystem 402, a user interface subsystem 404, a power subsystem 406, a control and data subsystem 408, and a sensor subsystem, within a housing. During system operation, the power subsystem 406 provides power from one or more different power sources with different characteristics and/or capabilities. The control and data subsystem 408 monitors the power subsystem 406 and/or the load subsystem 402 and adjusts power provisioning according to the dynamic loading activity of the load subsystem 402 based on user settings obtained via the user interface subsystem 404 and/or the sensor subsystem 410. Additionally, system status and user feedback may be provided to/from the user via the user interface subsystem 404.

While the illustrated system is presented in the context of a portable lighting device, the system may have broad applicability to any lighting system. Such applications may include personal, industrial, security, medical, and/or scientific devices.

The following discussion provides functional descriptions for each of the logical entities of the exemplary lighting system 400. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary lighting system 400 is separately provided below.

5 Load Subsystems

Within the context of the present disclosure, the load subsystem 402 consumes power that is provided from the power subsystem 406. In one aspect of the present disclosure, the load subsystem 402 dynamically varies its load; the dynamic characteristics of the load may be monitored to select, prioritize, or otherwise inform power provisioning (controlled by the control and data subsystem 408).

As used herein, the term "load" refers to any device or component that consumes electrical energy to perform a specific function. A dynamic load refers to an electrical load that varies its power consumption due to its operating conditions and/or the specific function it performs. A static load refers to an electrical load that has a constant power consumption.

An electrical load may be characterized according to the voltage (measured in "volts" (Joules/Coulomb)) and current (measured in "amps", (Coulombs/second)) the load uses. Power consumption is typically measured in "watts" (volts× amps=watts (Joules/second)). Notably, power consumption is a function of impedance which has two components: resistance and reactance. Resistance measures opposition to the flow of electrical current, whereas reactance measures opposition to a change in electrical current. Reactance may be further sub-divided into inductive reactance and capacitive reactance. Inductive reactance stores energy in the form of magnetic field hysteresis; thus, the change in current "lags" the change in voltage. In contrast, capacitive reactance stores energy as differences in electrical fields thus, the change in current "leads" the change in voltage. The combination of resistance (real) and reactance (imaginary) describes a complex impedance having a magnitude and phase. Notably, reactance stores, but does not consume, power—thus, reactive components are not "dynamic loads" since they do not vary their power consumption.

Electrical systems that switch in/out portions of circuitry are one type of dynamic load behavior. For example, Pulse Width Modulation (PWM) and Pulse Density Modulation (PDM) circuits may switch on/off according to different widths or densities. Other examples include electrical subsystems that can be enabled/disabled either in whole or in part. For example, gate logic and other hardware may be enabled/disabled with clock gating and/or power gating. More generally, however, any time varying load may be substituted with equal success. For example, Pulse Amplitude Modulation (PAM) may increase/decrease impedance to affect the resulting amplitude. As another such example, variable resistances may be used to adjust current flow (e.g., potentiometers and/or rheostats) of analog circuits.

The permissible static and dynamic behavior of electrical signals may be parameterized for a load in a variety of ways. The following listing is illustrative, other load parameters may be used with equal success.

A "nominal" quantity is a specified or typical quantity (e.g., voltage, current, frequency, etc.) that an electrical or electronic component, circuit, or device is designed to operate under normal conditions. It serves as a reference value for the expected value. "Maximum" and "minimum" refer to the highest and lowest values, respectively, that a component, circuit, or device can withstand without suffering damage or exceeding its rated specifications. "Peak" and "trough" refer to the highest and lowest values, respectively, that a component, circuit, or device is designed for to maintain proper operation.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

A "duty cycle" describes the fraction of time during which a periodic signal (such as a pulse or waveform) is in an active state compared to its total period. For example, an 80% duty cycle (sometimes also referred to as an 80/20 duty cycle) refers to a signal that is on for 80% of the cycle (and off for 20% of the duty cycle).

A "slew rate" refers to the rate at which a signal changes over time. For example, slew rates for voltages are often expressed as volts/microsecond.

A "spectral envelope" is a representation of the amplitude characteristics (magnitude) of the frequencies present in a signal or spectrum. It provides information about the dominant frequency components of a signal. A "roll-off frequency" is the point in a frequency response at which the amplitude or power of the signal begins to decrease rapidly. It is typically defined as the frequency at which the response is reduced by a certain amount, often measured in decibels.

The following discussions provide several illustrative embodiments of dynamic loads, however, artisans of ordinary skill in the related arts given the contents of the present disclosure will readily appreciate that the virtually any dynamic load may be substituted with equal success.

5.1 Transducer Components

As used herein, the term "transducer" and its linguistic derivatives refer to components that convert (transduce) energy from a first form to a second form. Forms of energy may include electrical, magnetic, chemical, mechanical, acoustic, optical, thermal, radio, etc. For example, an RF antenna is an example of an electromagnetic transducer (converting electromagnetic waves to/from electrical energy), a speaker is an example of an electroacoustic transducer (converting electrical energy to/from acoustic waves), an LED is an example of an electro-optical transducer (converting electrical energy to incoherent light), etc. Various embodiments of the load subsystem convert (transduce) electrical energy into another form to perform its task; dynamic transduction may entail dynamic loading.

In one embodiment, the load subsystem transduces electrical energy to electromagnetic radiation. EM radiation refers to oscillating electric and magnetic fields that propagate together in the same direction, perpendicular to one another. For example, the load subsystem may be a light module that generates visible light. The light module may include a bulb (incandescent, halogen), light emitting diode (LED), gas-discharge lamp (fluorescent tubes, neon, sodium vapor), lasers, or other light generating device. A bulb includes a wire filament enclosed in a vacuum or inert gas; the resistance of the filament is used to convert electrical energy to heat and light. An LED is composed of a diode junction manufactured from semiconductors with specific electroluminescent properties (e.g., gallium arsenide (GaAs), gallium phosphide (GaP), etc. When electrical energy is applied to the diode junction, electrons are forced to combine with electron holes; this process converts some electrons to photons (light). Gas-discharge lights pass electrical energy through ionized gasses; the ionized gases have quantum energy states so excess energy is released as EM radiation. The EM radiation is absorbed by a phosphor coating, which re-emits it as visible light. Lasers (light amplification by stimulated emission of radiation) use electrical energy to stimulate a gain medium (e.g., gas, liquid, solid); once energized, some atoms of the gain medium emit radiation. The emitted radiation triggers other atoms of the gain medium to emit more radiation; resulting in a rapid amplification of coherent light. The gain medium lies in a resonant cavity of the laser which allows continued amplification even as some portion of the light are output.

In addition to the light generating element, the light module may incorporate passive lenses, diffusers, reflectors, waveguides, and/or any other components or combinations of components configured to direct or disperse the light. For example, lenses are typically manufactured from a transmission medium (e.g., glass, acrylic, polycarbonate, etc.) which has been physically formed to bend (refract) light as it passes through. The lens physical shape may be convex (that causes light to converge), concave (that causes light to diverge), or a piecewise combination. In some applications, multiple lenses may be used in combination to provide refraction characteristics that are not possible (or practical) to implement with a single lens. Diffusers scatter, spread, and/or soften light as it passes through. Examples of diffusers include e.g. diffuser films, prisms, or translucent materials (e.g., frosted glass/acrylic, etc.). Reflectors reflect some (or all) of the light; reflectors are often used to direct light in a particular direction. Reflectors can be made from a wide range of materials, including metals, glass, plastics, and specialized coatings designed for specific wavelengths or applications. The design and geometry of a reflector determine its reflective properties and how it redirects or concentrates light. Waveguides use internal reflection to guide and confine light from one point to another; typical examples of waveguides include e.g. fiber optics for light as well as microwave waveguides and radio waveguides.

More generally, while the foregoing discussion is presented in the context of visible light applications (e.g., security lighting, lanterns, flashlights, head lamps, work lights, etc.), any EM radiator (and associated peripherals) may be substituted with equal success. EM radiation spans a very wide spectrum from e.g., radio waves, microwaves, infrared (IR) or heat, visible light, ultraviolet (UV), x-rays, gamma rays, etc. Such devices may include e.g., telecommunications radios, microwave transmitters/ovens, IR transmitters/elements, UV lamps, X-ray lamps, etc.

In one example, the exemplary lighting system 400 may server as a speaker for playing music, a speaker and microphone "intercom" for hands-free cellphone operation, a device hub, an external hard drive for storing/transferring media, etc. Media playback assemblies may include associated components: e.g., a wired/wireless interface (e.g., USB™, Bluetooth®, Wi-Fi™, etc.), codecs, user interfaces, screens, speakers, and/or microphones.

In one embodiment, the load subsystem 402 transduces electrical energy to acoustic waves. An acoustic wave is a mechanical wave that propagates through a physical medium (air, water, solids, etc.) by causing particles in the medium to oscillate or vibrate. In one implementation, the load subsystems 402 include a moving-coil speaker module that generates audible sound. Such speakers include a diaphragm (cone) that is attached to a coil, and magnet. When an electrical current passes through the coil, the coil generates a magnetic field that interacts with the magnet, causing the coil (and diaphragm) to move. Oscillating the diaphragm within certain frequency ranges and at sufficient magnitudes results in audible sound. Other examples of speakers include electrostatic speakers and planar magnetic speakers. Electrostatic speakers move an electrically charged diaphragm between perforated metal plates by changing the electrical charge of the plates. Planar magnetic speakers move a magnetic diaphragm using an electrically induced magnetic field. Each of these speaker technologies transduces electrical energy into acoustic waves.

Audio devices may include without limitation: audio/visual (AV) players (e.g., laptops, portable stereos, etc.), personal communication devices (e.g., walkie-talkies, smartphones, etc.), home/professional entertainment systems, public address systems, voice assistants, and/or any other personal, industrial, financial, medical, and/or scientific devices that employ audible sound.

Furthermore, much like light, acoustic waves exist on a spectrum that includes infrasound, audible sound, and ultrasound. While the foregoing selection describes audible acoustic applications, non-audible acoustic applications may use other forms of transduction. For example, ultrasonic transducers apply electrical current to piezo-electric elements to vibrate and generate ultrasonic acoustic waves. Ultrasonic waves are used for a variety of medical and industrial applications. Similarly, infrasonic waves may be generated by motors/vibrators; infrasound travels well in liquid/solid mediums and has applications in seismology and/or petroleum exploration, etc.

In one embodiment, the load subsystem 402 converts electrical energy to mechanical movement. Typically, electro-mechanical movement uses electrical current in combination with permanent magnets to create attraction/repulsion forces. These techniques are commonly used in relays, solenoids, electric motors, stepper motors, linear actuators, servo motors, etc. Mechanical movement may include regular movements such as linear motion, reciprocating motion, rotary motion, oscillatory motion, as well as irregular movements such as cam-based motion, linkages, and eccentric motion.

Electro-mechanical devices may include without limitation: consumer electronics, hand tools and power tools (e.g., drills, screwdrivers, saws, sanders, routers, impact drivers, sprayers, heat guns, nail guns, rotary tools, random orbital sanders, and/or any other similar tools), and/or any other personal, industrial, financial, medical, and/or scientific devices that employ mechanical motion. While the foregoing selection describes electro-mechanical applications for hand-operated applications, artisans of ordinary skill in the related arts will readily appreciate that electro-mechanical motion may also be used in robotics, transportation, industrial automation, and/or drone-based applications. Such applications may also incorporate electro-mechanical transducers of extraordinarily small (or large) scale, such as piezo-electricity, nanotechnologies, etc.

While the foregoing discussion provides several illustrative transduction technologies, virtually any transduction technology with dynamic loading may be substituted with equal success, given the contents of the present disclosure.

5.2 Signal Processing Components

Aspects of the present disclosure may be used in conjunction with dynamic loads of signal processing. Signal processing refers to techniques that manipulate, analyze, and interpret electrical signals, which are representations of data in either analog or digital form. Functionally, semiconductors consume power during operation due to internal resistances. As a result, the dynamic loads associated with signal processing are a function of e.g., processing complexity (e.g., data size, compute cycles, memory accesses, etc.), dynamic behavior (e.g., enable/disable, load balancing, etc.), and/or application considerations (e.g., real-time budgets, best-effort processing, etc.).

As used herein, the term "real-time" refers to tasks that must be performed within definitive time constraints; for example, a video camera must capture each frame of video at a specific rate of capture. As used herein, the term "near real-time" refers to tasks that must be performed within definitive time constraints once started; for example, a smart phone must render each frame of video at its specific rate of display, however some queueing time may be allotted for buffering. As used herein, "best effort" refers to tasks that can be handled with variable bit rates and/or latency. As but one such example, a user that wants to view a video on their smart phone can wait for the smart phone to queue and post-process video.

In one embodiment, the load subsystem 402 includes a signal processor that manipulates electrical signals in the analog domain. In other words, information is conveyed via voltage and/or current. Functionally, analog processing may consume power to amplify/attenuate and/or synthesize intermediate signals and waveforms. Examples of analog signal processing include without limitation: amplification/attenuation, filtering, modulation/demodulation, signal conditioning, analog-to-digital (ADC)/digital-to-analog (DAC) conversion, automatic gain/frequency control (AGC/AFC), waveform synthesis, voltage/current regulation, mixing, phase shifting, isolation, equalization, and/or any other such operation. Analog signal processing is commonly used in sensors, telecommunications, audio processing, instrumentation, control, and any number of digital signal processing applications.

In one embodiment, the load subsystem 402 includes a signal processor that switches between operational modes (enables/disables circuitry) to perform signal processing. For example, a multicore processor may shift processing burden between cores (disabling a first core, transferring data, enabling a second core). Similarly, a processor may enable/disable processing elements between different power states (idle, low power, sleep, etc.). As another example, modems often wake-up to respond to communication requests (which could occur at any time), and sleep to save power when not in use.

As a related corollary, in "fixed-width" processing embodiments, data is processed using a fixed number of bits, such as 8, 16, 32, or 64 bits, etc. However, some embodiments may support "variable-width" processing and/or variable-length encoding which dynamically adjust the number of bits used to represent and process data based on the needs of a particular computation. This can be particularly useful for computational and/or memory efficiency. In other words, unnecessary computations may be avoided and/or unnecessary precision can be disregarded (e.g., saving memory space, reducing data transfers, etc.). Variable-width processing may be particularly useful in applications where lossy data is acceptable; examples include communication protocols, media playback, and/or neural network computing.

In one embodiment, the load subsystem 402 includes a signal processor that adjusts the operation of its gate-level circuitry. As a brief aside, gate-level circuitry refers to digital electronic circuits at the most fundamental level, where digital signals are represented with electrical voltages and drive currents (e.g., a Boolean "0" corresponds to GND voltage, a Boolean "1" corresponds to VCC voltage, etc.). So-called combinatorial logic emulates logical gates (e.g., AND gates, OR gates, NOT gates, NAND gates, NOR gates, XOR gates, XNOR gates, etc.). One example of an operational change that affects the power consumption of the signal processor is the voltage level (which may affect the robustness and reliability of transitions between logical levels). Sequential gates store logical values as electrical charges (e.g., registers, flip-flops, memory, and/or any other non-transitory computer-readable media). Operational changes that affect sequential gate logic include clock rate and/or drive current; in some cases, increasing/decreasing drive current may be used to enable faster clock rates and/or longer signaling distances.

The aforementioned techniques (switching operational modes, changing gate-level circuitry, and/or changing data sizes) are used in many computing devices including without limitation e.g., controllers, general-purpose processors, graphics processors (GPUs), neural network processors (NPUs), image signal processors (ISPs), digital signal processors (DSPs), modems, networking processors, field programmable gate arrays (FPGAs), codecs, application specific integrated circuits (ASICs), and/or any other semiconductor logic. Such computing devices may be combined with other circuitry (e.g., data storage circuitry, sensors, other signal processing components) on one or more printed circuit boards (PCBs) within a device. Such components are often found in devices such as: computers, smartphones, laptops, terminals, servers, workstations, etc. While the foregoing discussion is primarily presented in the context of embedded and portable devices, the concepts may be broadly applied to any signal processing application that may need to dynamically adjust operation based on its power source.

5.3 Energy Transfer Components

Aspects of the present disclosure may be used in conjunction with energy transfer applications. Energy transfer technologies move energy from one device to another device, or store energy in another form for storage/delivery. The conservation of energy is a fundamental principle of physics that prevents energy from being created or destroyed in a closed system (e.g., the energy donor and energy recipient), however practical implementations have some efficiency losses due thermal waste, frictional losses, etc. Examples of energy transfer applications include for example: charging a battery, wireless power transfer, etc.

The energy transfer techniques described above are used in portable chargers, battery packs, power banks, jump starters, generators, and/or other power sources. In many cases, these devices may charge other devices such as smartphones, laptops, cameras, hand tools, power tools, car batteries, and/or other powered devices. These power storage devices are commonly used by working professionals, travelers, outdoor enthusiasts, and/or any other work application where access to power is limited. In one embodiment, the load subsystem 402 of the exemplary lighting system 400 delivers power to another device (e.g., an attached device, an external sensor, etc.). For example, the exemplary lighting system 400 may provide energy to another device (or devices) via a wired or wireless interface. Examples of wired interfaces include, without limitation: Universal Serial Bus (USB) and its derivatives, Lightning®/Magsafe®, charging contacts and charging rings, and any other proprietary charging interfaces, barrel connectors and AC plugs, etc. Wireless charging interfaces include, without limitation: inductive charging, magnetic resonance charging, RF charging, ultrasonic charging, beamforming and/or resonant coupling, etc. In some examples the exemplary lighting system 400 may provide energy to multiple external devices.

6 User Interface Subsystem

Functionally, the user interface subsystem 404 conveys (outputs) information to the user in visual, audible, and/or haptic form. Similarly, the user inputs information via physical or virtual interactions. The following discussions provide several illustrative embodiments of user interfaces, however, artisans of ordinary skill in the related arts given the contents of the present disclosure will readily appreciate that the virtually any user interface may be substituted with equal success.

User interfaces often incorporate mechanical elements including, without limitation: buttons, switches, knobs, levers, dials, joysticks, keyboards, mice, pedals, handles, and/or any other physical components that users may interact with to provide information to the system. For example, a user may press a physical button, click on an icon using a mouse, input text via a keyboard, etc.

For example, a mode dial may be used to indicate a mode of operation. A user may turn or otherwise manipulate the mode dial which trigger switches/positional sensors to indicate a mode/change of mode. In another example, a button or array of buttons may be interacted with to change the mode of operation. Clicking the button may toggle through each of the modes. Holding the button for a certain length may change the mode of operation. A combination of button presses on multiple buttons may change the mode. Multiple input devices may be used in combination to perform certain operations. For example, setting the light output for a constant lighting mode may include holding down a button while turning a dial.

User interfaces often incorporate visual elements, including without limitation: light emitting diodes (LEDs) and variants (e.g., OLEDs, MicroLEDs, etc.), liquid crystal displays (LCDs) and their variants (quantum dot displays (QLED), etc.), e-paper, cathode ray tube (CRT), projection displays, etc. In many cases, these visual elements may be used alone, or in conjunction with other modalities of input/output, for communication. As but one example, a set of light emitting diodes (LEDs) may be used to convey the estimated remaining voltage and charge of a corresponding set of batteries, based on position, color, intensity of illumination, and/or rate of blinking, etc. As another example, a graphical user interface using a virtual "desktop" may be displayed on a screen or touchscreen. The user may interact with icons on the desktop using a mouse and input text commands with a keyboard to see current power status (e.g., clicking on a battery icon opens a current estimated remaining voltage and charge for each battery, etc.).

Some user interfaces incorporate sound and/or audible information. For example, sounds and/or audio may be presented to the user (or captured) via a microphone and speaker assembly. In some situations, the user may be able to interact with the device via voice commands to enable hands-free operation.

Certain user interfaces incorporate motion and/or spatial information. For example, rumble boxes and/or other vibration media may provide haptic signaling. Cameras, accelerometers, gyroscopes, and/or magnetometers may be used to sense the user's physical motion and/or orientation to enable gesture-based inputs.

Most user interfaces incorporate multiple modalities of input. For example, augmented reality (AR) and/or virtual reality (VR) environments have been used in head-mounted apparatus (helmet, glasses, etc.). Such devices often incorporate visual, audio, and/or haptic information to the user.

Within the context of the present disclosure, system status and user feedback may be provided to/from the user via the user interface subsystem 404 (controlled by the control and data subsystem 408).

7 Sensor Subsystem

Functionally, the sensor subsystem 410 detects changes to or the state of the device, the environment, or the output of another system. The sensor subsystem 410 may convert a physical phenomenon into a voltage (e.g., an analog voltage/digital signal) as input to the control and data subsystem 408 and/or the user via the user interface subsystem 404. Sensors input may be used as part of the user interface subsystem 404 to determine user movement, gestures, etc. as inputs to the exemplary lighting system 400. The following discussions provide several illustrative embodiments of sensors, however, artisans of ordinary skill in the related arts given the contents of the present disclosure will readily appreciate that the virtually any sensor may be substituted.

The sensor subsystem 410 may include sensors to detect the state of the device. These may include temperature sensors, voltage sensors, etc.

Temperature sensors may include devices that detect/measure heat and convert the measurement into an electrical signal. In some examples, a voltage may be detected across a diode to determine a resistance. Since the resistance of the diode varies proportionally to a change in temperature, temperature may be determined based on, e.g., by converting, the voltage reading. In other examples, dissimilar materials (e.g., two metals) that have different expansion/contraction properties, are used to determine a temperature/a change in temperature. For example, in a vibrating wire temperature meter, a stretched magnetic wire with two ends fixed to the dissimilar metals can detect changes in temperature based on a change in the vibrations of the wire. This may be due to a change in tensile strength of the wire because of the expansion/contraction of the metals. In another example, a thermocouple may sense temperature changes by detecting a voltage where dissimilar metals are joined at the point of connection.

Temperature sensors may be used to measure the temperature of components in the exemplary lighting system 400. The temperature of LEDs or a LED assembly may be monitored via a temperature sensor. In some examples, the lumen output of the LEDs may be reduced when the temperature is detected as being at or above a temperature threshold and raised when at or below another temperature threshold in certain modes of operation (e.g., in an extreme lighting mode). The lumen output may be increased or decreased after the temperature is above/below the temperature threshold for a particular period of time (or after a certain number of readings of the temperature sensor). In other examples, the LEDs or the exemplary lighting system 400 is powered off when the temperature is detected above the threshold. Active cooling e.g., with a fan, may be used to cool the LEDs when the temperature of the LEDs are above the threshold.

A voltage sensor is a sensor used to monitor, calculate, or determine a voltage supply. Voltage sensors may be able to determine the voltage level of alternating current (AC) or direct current (DC) power sources. The input of voltage sensors may include positive and negative wires/pins. Output may include analog or digital data about the voltage. For example, output may include analog voltage signals, switches, audible signals, analog current levels, frequency, or frequency-modulated outputs. Two classes of voltage sensors include resistive types and capacitive types. Voltage sensors may include a voltage divider and bridge where voltage is separated. In resistive type voltage sensors, multiple resistors (e.g., a static resistor providing a reference voltage and a variable resistor) may be used to sense the difference of voltage based on the difference in the resistance of the resistors. In capacitive type voltage sensors, multiple capacitors may be used to sense the difference in capacitance to indicate the voltage.

Voltage sensors may be used to detect power failures and faults, the addition or changing of a load, to control temperature, to control power demand, and to determine the amount of charge remains in power sources. The exemplary lighting system 400 may adjust, in certain operating modes due to voltage sensor readings. For example, the voltage of a power source (e.g., a battery) may be used to determine the remaining battery which may be used to activate low power modes; power faults may be detected to turn off the exemplary lighting system 400 to preserve components during a fault, etc.

Light sensors, including ambient light sensors (ALS), measure the brightness of light (lux) incident on a surface. ALS may be configured to be sensitive to radiation within the range of human vision (approximately 300-1100 nm). In some examples, an ALS may be constructed using a silicon photodiode that converts light to an electrical signal using the photoelectric effect based on a generated electron flow (current) that may be measured. The silicon photodiode may include filters to block certain wavelengths of radiation, such as ultra-violet and infra-red. In some exemplary applications, a camera or photocell may be used as an ALS.

In some examples, an ALS may be used to measure the light in the environment near the exemplary lighting system 400. The exemplary lighting system 400 may adjust, in certain operating modes (e.g., an automatic lighting mode), the brightness and/or color temperature of the LEDs of the exemplary lighting system 400 in response to the determined brightness or color temperature detected by the ALS. LEDs may be powered on when an ALS detects below a certain threshold amount of light.

Inertial sensors may be used to measure the motion of an object (e.g., the exemplary lighting system 400) with respect to an inertial reference frame. Inertial sensors may include gyroscopes, accelerometers, magnetometers, and barometers. The number of axes an inertial sensor may detect is based on the number of different measurements over a number (e.g., 1-3) of different axes. Accelerometers may be used to detect linear acceleration. Gyroscopes may be used to detect a rotational rate. Magnetometers may detect a magnetic field and be used to determine a magnetic field (e.g., of the earth) for use, e.g., as a heading reference. In some examples, an inertial sensor may include one accelerometer, gyroscope, and magnetometer per axis for each of the three principal axes: pitch, roll and yaw.

In some examples, inertial sensors may be used to determine movement of the device and calculating position and velocity (via, e.g., dead reckoning). The exemplary lighting system 400 may adjust, in certain operating modes brightness/operating mode when the device is moving or not moving (e.g., going to or out of an idle mode) after a certain threshold of time elapses without movement. Gestures may be determined by the exemplary lighting system 400 using inertial sensor data to determine user input. Accordingly, operating modes may be determined or altered based on these determined gestures. Gestures may include shaking the device, spinning the device, tossing the device, etc. in particular directions or a certain number of times.

Motion sensors detect the motion of objects in a specific area. A Passive Infrared (PIR) motion sensor is a device that detects motion by measuring changes in infrared radiation caused by the movement of warm objects. PIR sensors are called "passive" because they do not emit any energy on its own; rather PIR sensors simply detect the infrared radiation emitted or reflected by other objects. Microwave motion detection operates by emitting continuous microwave signals into the monitored area and analyzing the reflections caused by moving objects. The motion detection sensor contains a transmitter that emits microwave signals, typically in the gigahertz (e.g., 10.525 GHz) range, and a receiver that captures the reflected signals. When there is no motion, the emitted and received signals match, indicating a static environment. However, when an object enters the monitored zone and disrupts the microwave pattern, the sensor detects a Doppler shift in the reflected signals due to the object's movement. The Doppler shift is caused by the change in frequency as the object approaches or moves away from the sensor. The sensor's electronics analyze these frequency changes to determine the speed, direction, and presence of motion. Different types of motion sensors may be used to detect motion in various directions and through objects (e.g., walls) by blocking or allowing the signal to pass through.

In some examples, motion detectors may be used to turn on or off lights when motion is detected or change the mode of operation based on the amount, type, and distance to the detected motion. For example, the brightness of the LED may be increased when motion is detected nearer (or farther from) the exemplary lighting system 400.

Global positioning/navigation sensors include receivers that may receive and track signals from one or more Global Navigation Satellite System (GNSS)/Global Positioning System (GPS) satellites in a constellation. These messages may include time information, satellite status/health information, satellite orbit data, etc. This data may be decoded to determine the position, velocity, and time of the receiving device (e.g., the exemplary lighting system 400) in combination with the messages from other satellites in the constellation.

In some examples, timing information may be used to power on/off the device (e.g. at a particular time of day or with respect to an astronomical event, e.g., sunrise or subset). Geofencing can be used to change device operation based on the determined position. For example, certain areas may not allow lighting above a certain brightness. The exemplary lighting system 400 may limit the brightness of the LED in those areas.

Within the context of the present disclosure, sensor data may be used as part of the user interface subsystem 404 and may be used or interpreted by the control and data subsystem 408.

8 Power Subsystem

As a brief aside, a "closed" electrical circuit provides a path for electric current to flow from a power source across a load; an "open" electrical circuit means that the path from a power source to a load has a gap which prevents the flow of electrical current. As previously alluded to, early electronics were designed for just a single power source and often directly connected power sources to the load, e.g., a battery might directly drive a bulb. Selectively providing power from multiple different power sources requires careful management of both the load requirements and the source output to prevent e.g., voltage/current mismatch, chemistry rate mismatch, capacity mismatch, etc.

Functionally, the power subsystem 406 connects one or more power sources to the load subsystem 402. In addition, the power subsystem 406 may also provide conditioning to compensate for differences between the required and provisioned electrical characteristics. For example, the power subsystem 406 may ensure that the voltage and current provided from the selected batteries, solar cell, fuel generator, outlet, charging device, etc. match the load requirements in terms of nominal values, rate of use, frequency, etc.

Much like the load subsystem 402, the power sources of a power subsystem 406 may also be characterized with source parameters. For example, source parameters for a battery might include its nominal voltage, maximum/minimum voltage, maximum current draw, etc. As a practical matter, many types of power sources do not provide information about their internal operations; for example, a battery may have a nominal voltage but the remaining charge is unknown. Similarly, a solar cell might provide power according to light which may vary, or an AC wall circuit might be shared with other loads.

Various embodiments of the present disclosure further characterize the power sources of a power subsystem with characteristic functions. As used herein, the term "characteristic function" and its linguistic derivatives refers to a relationship between known and unknown quantities. For example, the measurable initial voltage across the terminals of a battery may be used to estimate the unknown remaining charge of the battery. Similarly, the voltage/current and/or line noise of an AC power supply may be used to characterize the unknown loads that are sharing the circuit, etc. Characteristic functions may be empirically determined, based on historic data, defined by manufacturer, user, vendor, etc. More directly, any technique for estimating an unknown quantity from observable quantities maybe substituted with equal success.

8.1 Power Sources and Storage

Power sources may be characterized by their output voltage and maximum supported current draw. As previously noted, power sources cannot provide voltage/current according to idealized curves. For example, a typical battery may have been specified to a nominal voltage and total capacity (number of Coulombs), however, limitations of the battery chemistry and parasitic impedances will affect the actual maximum output current. Similar limitations exist for other forms of power generation (e.g., solar power, outlet power, fuel cells, etc.). Thus, different power sources may have different utility for meeting the dynamic needs of the load subsystem.

8.1.1 Single-Use and Rechargeable Batteries

Compared to rechargeable batteries, single-use batteries store charge longer in extreme temperatures and when not in use (the so-called "self-discharge rate" is the rate at which the stored charge in a battery is reduced due to internal chemical reactions of the battery). Certain types of alkaline batteries, for example, have a shelf life of ten years. Single-use batteries are therefore well suited for emergency-use applications.

Single-use batteries must be replaced after use, thus a cost comparison of single-use batteries and their rechargeable counterparts should consider replacement cost and access to recharging power. Many high-power output products today consume single-use batteries in just a few hours, and performance is frequently inferior to rechargeable batteries at low battery life. Replacement costs can quickly eclipse the low per unit cost of single-use batteries. Further, rechargeable batteries, while having a larger up-front cost than single-use batteries, can be recharged with relatively inexpensive power from, e.g., an outlet. As a result, rechargeable batteries allow for more cost-effective use over their lifetime.

Most batteries use one or more electrochemical cells to store energy as a chemical potential between reactants. During discharge, a chemical reaction converts high-energy reactants to lower-energy products, and the free-energy difference is delivered to the external circuit as electrical energy. Rechargeable battery chemistries allow for both charging and discharging cycles (e.g., charging the cell reverses the chemical process). Batteries come in a variety of sizes and chemistries. Examples of battery chemistries include, without limitation: alkaline, lithium-ion, lead-acid, nickel-cadmium, nickel-metal hydride, lithium polymer, zinc carbon, silver-oxide, zinc-air, sodium-ion, etc. Commonly available single-use sizes include without limitation: AA, AAA, C, D, etc. Rechargeable batteries are available in the legacy cell formats, but also have new formats such as: 10440, 14500, 18650, 26500, 32600, etc.

In one embodiment, the power subsystem 406 uses batteries to store power. In some variants, exemplary lighting system 400 may house multiple power sources of different types and sizes. For example, exemplary lighting system 400 may have a combination of rechargeable and single-use (dry cell) batteries. The rechargeable batteries may be removable or permanently affixed. The batteries may be stored and used in a removable battery cartridge (housing). While some battery cells may each provide approximately 1.5V, the differences in their individual capacities, discharge rates, and chemistries may be suited to certain tasks. For example, the AA cells may be useful for low intensity, short duration tasks (e.g., low illumination settings, soft background music, etc.). D cells may allow for high intensity, long duration tasks (e.g., high intensity lights, klaxon alarms, public address volumes, etc.). The rechargeable cells may be suitable to offload tasks and lengthen the usable life of the single-use cells. In some cases, the rechargeable cells may be charged in device when external power is available e.g., via holster, solar cells, AC adaptors for outlets, etc.

In some implementations, the power subsystem 406 may incorporate internal batteries. Internal batteries are an integral part of the system's structure and are typically not removeable without e.g., specialized tools, voiding the device warranty, etc. Internal batteries are often used to e.g., support specialized power requirements, enable aggressive design form factors, incorporate proprietary technologies, and/or to reduce the cost of single-use/disposable type devices. In some implementations, the power subsystem 406 may include housings and connection interfaces to allow for external battery connections; this allows the user to remove and replace batteries. Still other implementations may include both internal and external battery components.

While the foregoing discussion is presented in the context of electro-chemical cells, the concepts are broadly applicable to any power storage apparatus. Examples of other electro-chemical techniques include, e.g., generators and fuel cells that consume fuel to generate electrical energy. Furthermore, the power subsystem 406 may incorporate other sources of power such as electro-optical cells (solar cells), electrical interfaces (e.g., wall socket power), and/or any other source of power.

8.1.2 Dynamic Loading of Power Sources

Some products have implemented dynamic loading capabilities-dynamic loading potentially offers better performance, longer battery life, and/or improved functionality. So-called Pulse Width Modulation (PWM) is one example of a dynamic loading strategy. Consider a PWM implementation that powers a Light Emitting Diode (LED) according to a selectable duty cycle. Specifically, the anode of the LED may be connected to the positive end of the battery source and the cathode of the LED may be connected to the drain of an N-Channel metal-oxide-semiconductor field-effect transistor (NMOSFET) switch. The source of the NMOSFET is connected to ground, and the gate is opened and closed by the PWM signal. The perceived brightness of the light is based on the duty cycle, e.g., 100% duty is the maximum brightness, 0% duty is off. Artisans of ordinary skill in the related arts will readily appreciate that other dynamic loading schemes provide similar behavior; these schemes may include e.g., Pulse Density Modulation (PDM), Pulse Amplitude Modulation (PAM), and other duty cycle-based modulation techniques.

Dynamic loading schemes provide substantial benefits over resistive dimming alternatives. NMOSFETs do not burn power during their off cycle which reduces power consumption and heating; this allows devices to stay cooler and last longer. Also, an NMOSFET is cheaper and smaller compared to power resistors. Unfortunately, these savings come at the cost of voltage stability, may also increase noise in the system.

Figure 5:
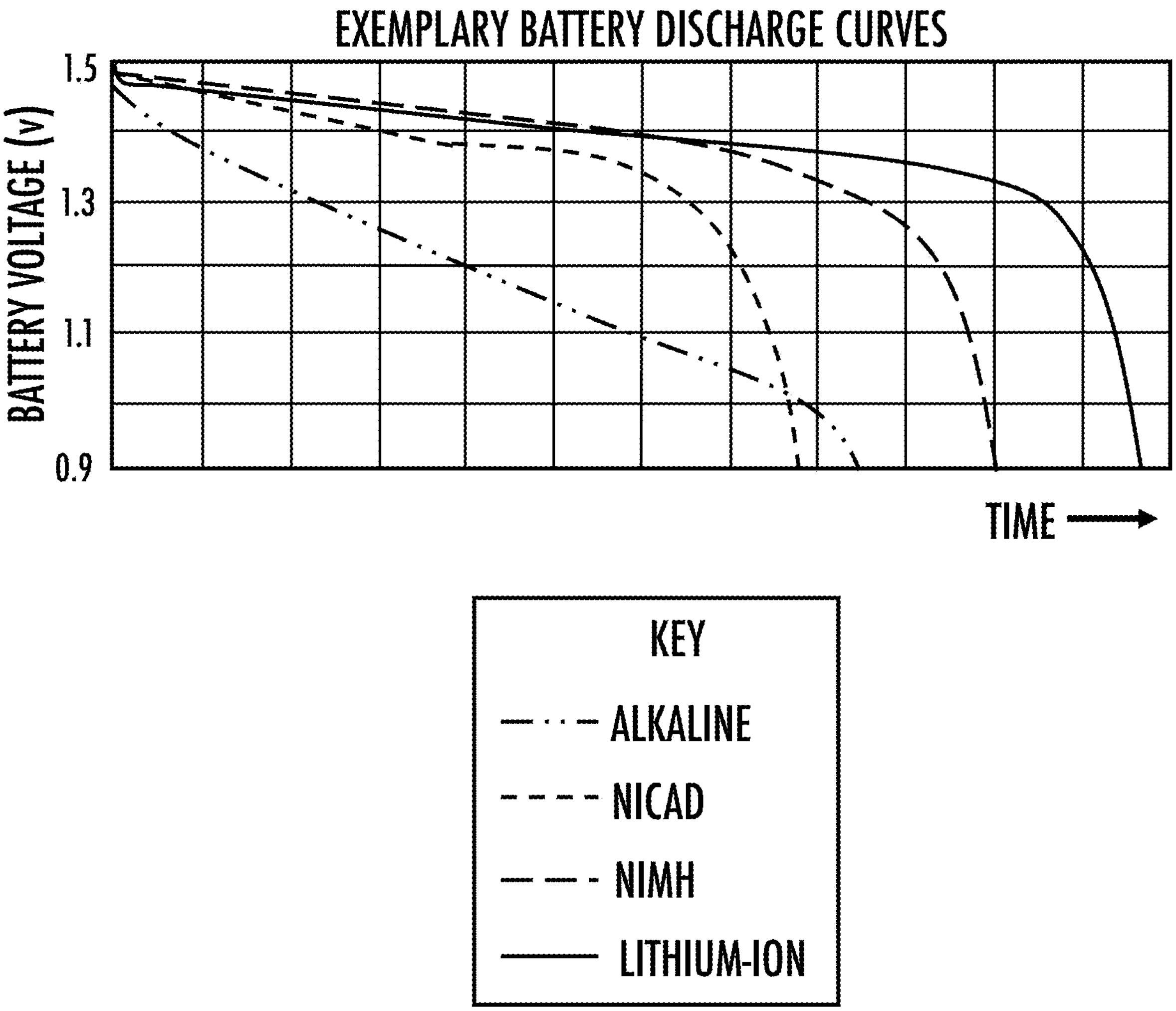
FIG. 5 is a graph illustrating exemplary discharge curves for single-use and rechargeable batteries.

As an important tangent, FIG. 5 is a graph illustrating exemplary discharge curves for single-use and rechargeable batteries. The graph illustrates the discharge curves (voltage) of four types of battery chemistries over time of use. Alkaline manganese dioxide (alkaline) batteries are single-use batteries. Nickel-cadmium (NiCAD) batteries, nickel-metal hydride (NiMH) batteries and lithium-ion batteries are rechargeable batteries. Even though all battery chemistries lose voltage over time, alkaline batteries (which are the most popular type of single-use battery) lose voltage at an almost constant rate over the span of discharge. Rechargeable battery chemistries lose voltage at a far slower rate, and drop-off before the battery is depleted. Conventional wisdom suggests that the differences in discharge rates means that single-use and rechargeable cells should not be directly electrically coupled together, since this may cause the cells to load one another unevenly and/or may reduce output, damage the cells, and in extreme cases, cause rupture and cell leakage.

The relatively constant rate of discharge for alkaline batteries simplifies battery-life determination compared to other battery chemistries; the remaining alkaline battery life can be directly estimated based on the output voltage (when not under load). In contrast, rechargeable battery chemistries can provide a relatively more consistent voltage level but may require more complex battery life determination (e.g., based on draw, temperature, usage, etc.).

Figure 6:
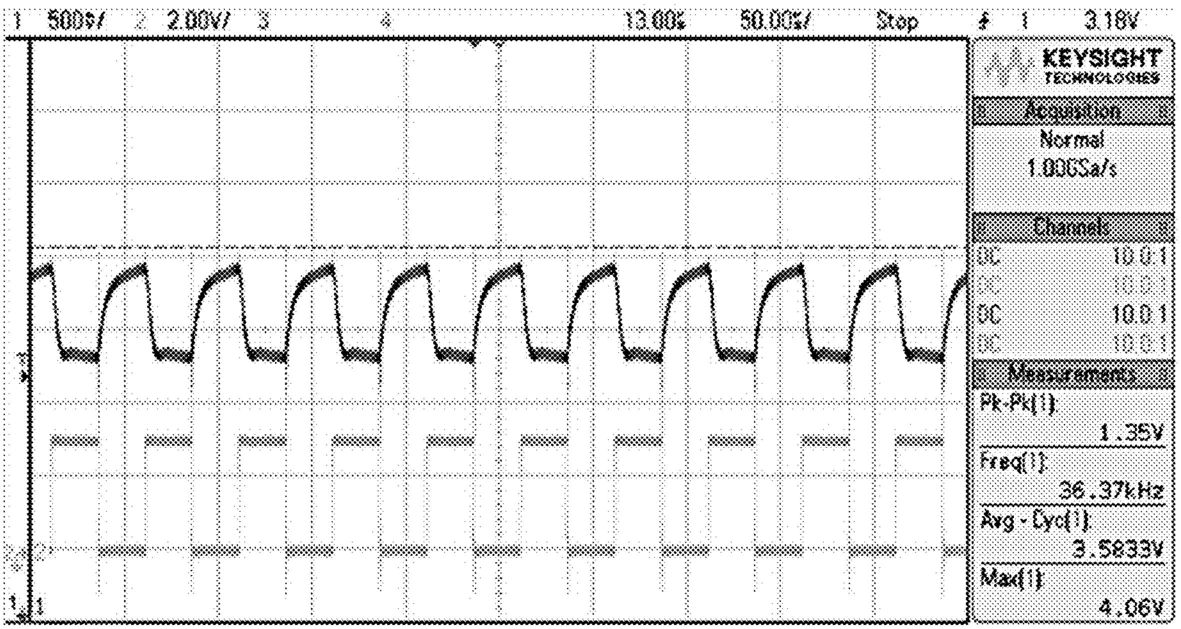
FIG. 6 illustrates voltage measurements for a Pulse Width Modulated (PWM) Light Emitting Diode (LED), useful to illustrate battery capacity measurements under dynamic loading conditions.
Figure 6:
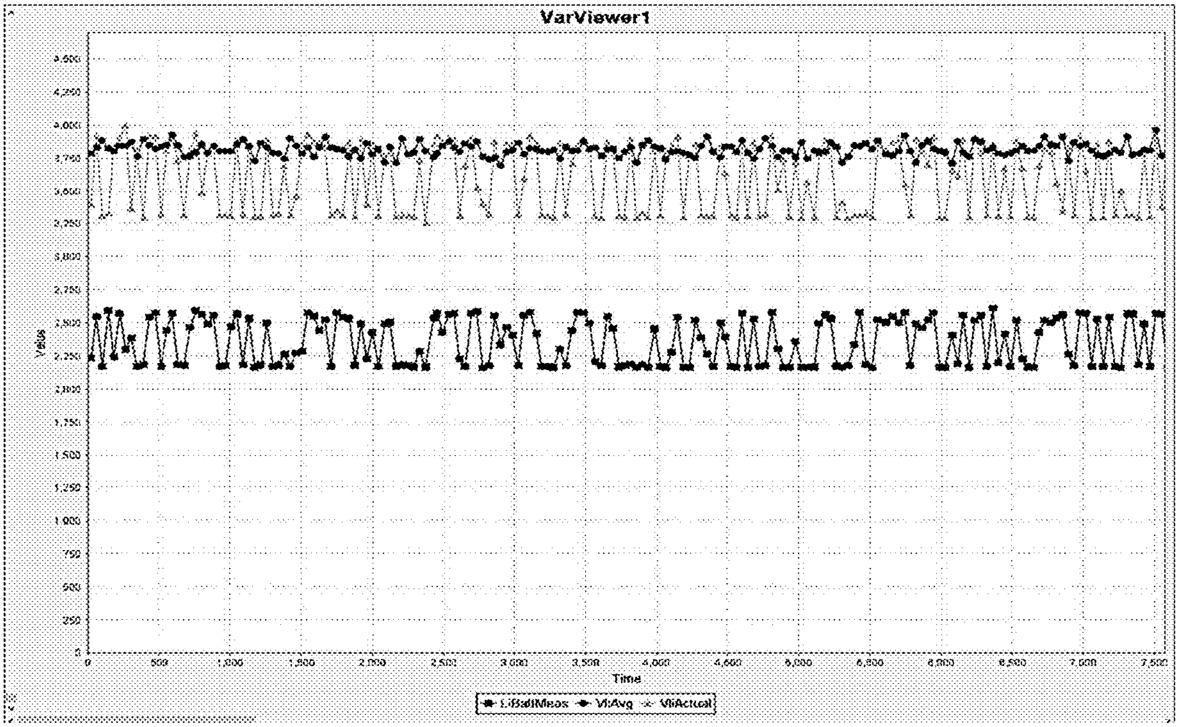

FIG. 6 shows a PWM LED implementation useful to illustrate battery capacity measurements under dynamic loading conditions. As shown, an NMOSFET gate is driven on/off at a 50% duty cycle. The battery and circuitry may also have internal resistances (R) and capacitances (C) which affect the rising and falling edges; for example, a square wave input will generate a rounded wave as the resistor-capacitor (RC) circuit charges and discharges (this effect may also be referred to as "$1^{st}$ order decay").

Battery capacity can be accurately measured based on Coulomb counting and battery voltage measurements. Unfortunately, these solutions are often cost prohibitive for low-cost applications. More cost-effective alternatives estimate the remaining charge based on the known discharge curve of the battery chemistry (such as was depicted in FIG. 5) and voltage measurements (using an analog digital converter (ADC)). Historically, most low-cost devices are designed for static loading, thus estimation has been an acceptable design choice.

Notably, static estimation techniques cannot be used under dynamic loading, since voltage is directly affected by the load (e.g., V=iR, i=CdV/dt, and/or any impedance.) A PWM driven NMOSFET results in highly variable voltage readings that present a challenge in estimating remaining battery capacity. As shown in FIG. 6, directly sampling the 50% duty cycle may capture an off-phase or the RC decay. Typically, measurements at ~50% duty cycle have the maximum amount of variation in the battery voltage; however, this may also vary based on current draw, sampling rate, etc. For example, large swings in current draw may cause erratic RC decay readings; similarly, irregular voltage sampling may coincidentally capture more off-phase measurements.

One scheme for dynamically estimating remaining battery capacity compares a "rolling window" of voltage measurements against characteristic discharge cycles for different duty cycles. The sampling rate of the battery measurement circuitry and the duty cycle are unlikely to exactly align. Different frequencies are orthogonal to one another within the frequency domain and will constructively and destructively interfere with one another according to a "beat frequency." However, time averaging the varying voltage can be used to filter out the non-DC (direct current) frequencies, leaving only a non-zero DC voltage. Even though the non-zero voltage is not a direct measurement of voltage, it may be used to characterize the voltage discharge curve for that combination of duty cycle and sample rate. While the foregoing technique uses a rolling window calculation, artisans of ordinary skill in the related arts will readily appreciate that a variety of other calculations may be substituted with equal success. Such other techniques may include time averaging, filtering, root-mean-square calculations, multiply-accumulate, and/or any other calculation that generates a characteristic non-zero value for a dynamic input.

More directly, battery voltage measurement data may be taken during a full discharge cycle at several different fixed PWM duty cycle values. Then, a "characteristic function" that describes the relationship between measured voltage and remaining battery capacity is determined based on one or more of: duty cycle, sample rate, battery chemistry, battery numerosity, battery configuration (parallel, series, etc.), or any other operational parameter. The characteristic functions can be stored within a device to enable subsequent determination of the specific battery capacity threshold based on the measured voltage.

In one embodiment, battery capacity estimation based on characteristic functions can be used within a holster or a flashlight. In such implementations, characteristic functions may be stored into the monitoring logic for battery capacity estimation. Specifically, the characteristic functions are measured and calculated for the exemplary lighting system 400, at 100%, 75%, 50% and 25% duty cycles using a specified sample rate (e.g., ~40 Hz). The characteristic functions correspond to each of the different battery types used by the exemplary lighting system 400—for example, each of the 3.7V lithium-ion batteries (rechargeable) or dry cell/single use batteries would have different characteristic functions. During operation, the monitoring logic may determine its battery configuration and collect time averaged battery voltage measurements. The monitoring logic may use the measured voltage to look-up the estimated remaining battery capacity based on the specific characteristic function for the duty cycle, sample rate, battery configuration, operational mode, and/or any other relevant parameter. The estimated remaining battery capacity may also be used to calculate a rate of change in the remaining battery capacity—this rate of change corresponds to the estimated current draw. The estimated remaining battery capacity and rate of change are collectively referred to throughout as the "usage estimates." The usage estimates can be provided to the user via user interface logic used to, e.g., indicate the remaining capacity and/or current draw on the indicator LEDs. In some variants, the monitoring logic may also inform the power management logic; for example, the remaining capacity and/or current draw may be used by the power management logic to select an appropriate power source.

In one specific variant, the time averaged battery voltage measurements are calculated over a rolling window of values (e.g., 4, 8, 16, 32-value average, etc.). Some battery chemistries exhibit misleading behavior based on load and/or environmental factors. For example, certain types of batteries may have a "false" recovery that results in a higher resting voltage; however, the voltage rapidly drops to a more representative voltage under load. In other cases, batteries may have a different characteristic voltage based on ambient temperature, humidity, atmospheric pressure, etc. In some variants, the device logic (hardware, firmware, or software) may use a "ratcheting" level that prevents misleading behavior of calculating remaining charge in the battery. In other words, the indicator LEDs cannot display a rise above a breached lower threshold until e.g., a battery has been changed/recharged or otherwise reset. For example, once the remaining capacity has fallen from 75% to 50%, the device logic will cap the subsequent readings to 50%. The device logic will only re-enable the 100% and 75% levels after a power cycle, batteries change (or charged), etc.

In some embodiments, the user interface logic provides a continuous read-out (to, e.g., the indicator LEDs). Other embodiments may allow the user to selectively check the battery usage estimates only "as-needed." For example, all LED rows may be only momentarily lit when the user presses the ON switch (e.g., power switch), or a user may be able to individually check the power for only one of the power sources (e.g., a small push button may allow a user to check the status of the battery, etc.). Still other implementations may allow display status briefly at the start of and/or periodically during, a specific operating mode.

More generally, the user interface logic of the PCB and indicator LEDs allows a user to determine the ongoing usage and remaining capacity for any one of the power sources. In some cases, the user may be alerted as to when to change batteries, switch power sources, and/or reduce usage. While the foregoing discussion is presented in the context of a specific arrangement and/or color code of LEDs, other arrangements/color codes, as well as other user interface schemes (e.g. audible and/or haptic) may be substituted with equal success (as discussed above with respect to indicator LEDs).

While the foregoing discussion is presented in the context of a specific arrangement and/or color code of LEDs, other arrangements/color codes may be substituted with equal success. Notably, any number of LEDs may be used to signify capacity according to any specific granularity. As one example, 10 LEDs may be used to provide 10% increments (a linear scale). In another example, 4 LEDs may be used to provide logarithmic scale increments (e.g., 10%, 25%, 50%, 100%). Different colors may also be used e.g., red, orange, yellow, green, blue, indigo, violet, etc. to represent different current draws. Still other variants may switch the representation e.g., the color may indicate the percentage left, the number of lit LEDs may represent the current draw.

While the foregoing is described in the context of an on-device visual display, other user interface schemes may be substituted with equal success. In some cases, the notifications may be audible and/or haptic. For example, beeps at different note pitches may be used to convey usage estimates. As but one such example, the number of beeps may indicate remaining capacity e.g., four beeps may indicate 100%, three beeps may indicate 75%, etc. The pitch of the beeps may indicate current draw e.g., 440 Hz (A4note) may indicate low/no draw, 523.25 Hz (C5 note) may indicate moderate draw, etc. As another example, a "rumble box" may use similar numerosity/frequency schemes to convey information in a tactile modality. In yet other schemes, usage estimates may be wirelessly transmitted to a remote device (smart phone or laptop) that can remotely notify the user according to an application user interface. A wide variety of other user experience (UX) may be substituted with equal success.

8.2 Protection Circuitry

Dynamic loading may introduce undesirable harmonics in either the power sources themselves or the load they are connected to. As a related note, AC power from wall outlets may have residual harmonics and/or noise (which may even survive AC/DC conversion). Examples of undesirable effects that may be introduced by harmonics may include e.g., overshoot/undershoot, noise, interference, fluctuations, etc. In a separate but related tangent, directly coupling different power sources together (without additional power management logic) may create voltage mismatches that damage other circuitry or lead to cell premature failure, excessive discharge, overheating, leakage, and eventually rupture. In view of these issues, power conditioning circuitry may be used to protect the load subsystem 402 and/or protection circuitry may be used to protect the power sources from one another.

Various embodiments of the present disclosure may incorporate power conditioning techniques to ensure that sourced power does not exceed acceptable tolerances, the rate of change does not exceed acceptable tolerances, and has (or does not have) certain frequency characteristics. As but one example, voltage and/or current regulation may ensure that overvoltage/undervoltage does not damage the load subsystem. Furthermore, additional resistance, capacitance, and/or inductance may be added to filter out problematic resonant frequencies. Non-linear components (such as Zener diodes, etc.) may also be used to ensure that excess power is diverted from sensitive circuits.

Certain harmonics may interfere with the normal operation of internal (or external) circuits. For example, duty cycle-based circuitry may introduce noise into the clocking signals of a nearby processor resulting in timing errors, etc. In some cases, certain frequencies are necessary for circuit operation. For example, some clock circuitry may use 60 Hz (from AC outlet power) to calculate timing; but synthesizing a 60 Hz power signal from battery-based power sources may not match the expected frequency content. Thus, frequency regulation may be used to stabilize frequencies, or synthesize additional frequencies.

More generally, artisans of ordinary skill in the related arts, given the contents of the present disclosure, will readily appreciate that any number of different power conditioning circuits may be used to clean and stabilize output power. Functionally, such conditioning circuits may e.g., regulate voltage, suppress transients, regulate frequencies, filter harmonics, filter noise, convert between voltage/current, etc.

8.3 Other Power Source Considerations

As a brief aside, alternating current (AC) and direct current (DC) are two fundamentally different ways of transmitting and using electrical energy. AC voltage periodically reverses direction. It continuously alternates between positive and negative cycles, creating a sinusoidal waveform. In contrast, DC voltage is unidirectional, meaning it flows in a constant direction from positive to negative terminals. AC is typically used for transmission and distribution because it can be easily transformed into different voltage levels using transformers. It is also used in most household and commercial electrical systems because it is easy to generate and distribute. Conversely, DC circuits are generally simpler; for example, a DC motor can vary speed and provides consistent torque (both of which are difficult to do with AC motors). DC circuits are commonly used in hand tools, electronic devices (like smartphones and laptops), automotive systems, and some specialized applications like solar photovoltaic systems.

In some embodiments, the exemplary lighting system 400 may incorporate rectifiers, inverters, and/or transformers. A rectifier may be used to convert alternating current (AC) voltage into direct current (DC) voltage. It "rectifies" the AC waveform by allowing current to flow in only one direction. An inverter does the opposite of a rectifier; it "inverts" DC voltage into AC voltage. Inverters generate a sinusoidal or modified sine wave AC output. Transformers can be used to increase (step-up) or decrease (step-down) the voltage level of an AC voltage without changing its frequency.

Transformers have a variety of useful properties. First, transformers may be used to match the voltage of electrical equipment to the available supply voltage. For example, industrial equipment may require a specific voltage level that differs from the standard distribution voltage. Secondly, transformers may be used to match the impedance between two components of a circuit, optimizing power transfer. This is particularly important in audio systems and radio frequency applications. Thirdly, transformers can introduce a controlled phase shift between the input and output voltages. This property is used in various applications, including power factor correction and inductive coupling in electronic circuits.

Another consideration for power sources is recharging functionality. During charging operation, the power subsystem 406 may recharge a battery (converting electrical energy to a chemical potential for storage). The charging process is typically a multi-stage process that e.g., delivers a constant current to the battery until the battery reaches a specified voltage level (a so-called "constant current" stage), deliver a constant voltage until the battery no longer consumes current (a so-called "constant voltage" stage), and maintains a low current to the battery to top-up from self-discharge (a so-called "trickle charge" stage). In some embodiments, the power subsystem 406 can both provide power, while also concurrently charging. For example, a device that may operate from wall socket power while also using excess power to charge its batteries.

In some variants, the power subsystem 406 may include a charging circuit that additionally monitors the charging source and destination to ensure that the charging process operates safely (overcharging can damage batteries and/or result in catastrophic failures). For example, charging circuitry may include circuitry to prevent over (and under) charging of a battery. The circuitry may include a protection circuit module (PCM) configured to manage basic safety functions of the battery including over-voltage, under-voltage, and over-current. In some cases, the PCM additionally monitors battery temperature which can be used to infer aspects of battery operation (e.g., performance, charging state, etc.). In some additional examples, the charging circuity includes a secondary safety circuit to protect the battery from charge in the event the primary safety circuit fails.

More generally, artisans of ordinary skill in the related arts will readily appreciate that integrating multiple power sources within a single system to service a variety of dynamic loads may require additional supporting circuitry to address these differences. For example, a system may have a transformer to step-down AC power, a rectifier to convert the reduced AC power into DC power, and a charging circuit that manages the battery charging process. As another such example, an inverter may be used to convert DC power to AC power for devices that are usually used with wall outlets.

9 Control and Data Subsystem

Within the context of the present disclosure, the control and data subsystem 408 monitors the power subsystem 406 and/or the load subsystem 402 and adjusts power provisioning according to the dynamic loading activity of the load subsystem 402. The following discussions provide several illustrative embodiments of control and data subsystem 408, however, artisans of ordinary skill in the related arts given the contents of the present disclosure will readily appreciate that the virtually any control and data logic may be substituted with equal success.

In one exemplary embodiment, the control and data subsystem 408 may include a processor and a non-transitory computer-readable medium that stores program instructions and/or data. During operation, the processor performs several actions according to a clock. These may be logically subdivided into a "pipeline" of processing stages. For example, one exemplary pipeline might include: an instruction fetch (IF), an instruction decode (ID), an operation execution (EX), a memory access (ME), and a write back (WB). During the instruction fetch stage, an instruction is fetched from the instruction memory based on a program counter. The fetched instruction is provided to the instruction decode stage, where a control unit determines the input and output data structures and the operations to be performed. These input and output data structures and operations are executed by an execution stage. For example, an instruction (LOAD R1, ADDR1) may instruct the execution stage to "load" a first register R1 of registers with the data stored at address ADDR1. In some cases, the result of the operation may be written to a data memory and/or written back to the registers or program counter.

Artisans of ordinary skill in the related arts will readily appreciate that the techniques described throughout are not limited to the basic processor architecture and that more complex processor architectures may be substituted with equal success. Most processor architectures implement e.g., different pipeline depths, parallel processing, more sophisticated execution logic, multi-cycle execution, and/or power management, etc.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: best-effort operating system (OS) functionality (power management, UX), memory management, etc. Typically, such CPUs are selected to have relatively short pipelining, longer words (e.g., 32-bit, 64-bit, and/or superscalar words), and/or addressable space that can access both local cache memory and/or pages of system virtual memory. More directly, a CPU may often switch between tasks, and must account for branch disruption and/or arbitrary memory access.

As another example, a microcontroller may be suitable for embedded applications of known complexity. Microcontroller operations may include, without limitation: real-time operating system (OS) functionality, direct memory access (DMA) based hardware control, etc. Typically, microcontrollers are selected to have relatively short pipelining, short words (e.g., 8-bit, 16-bit, etc.), and/or fixed physical addressable space that may be shared with hardware peripherals. Typically, a microcontroller may be used with static/semi-static firmware that is application specific.

Application specific integrated circuits (ASICs) and field-programmable gate arrays (FPGAs) are other "dedicated logic" technologies that can provide suitable control and data processing. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication-as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0 #b'11 and setting all other locations to be "0" the 2-input LUT emulates an AND gate. Conversely, by storing "0" into the location of 0 #b' 00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

9.1 Power Source Selection and Monitoring Logic

Figure 7:
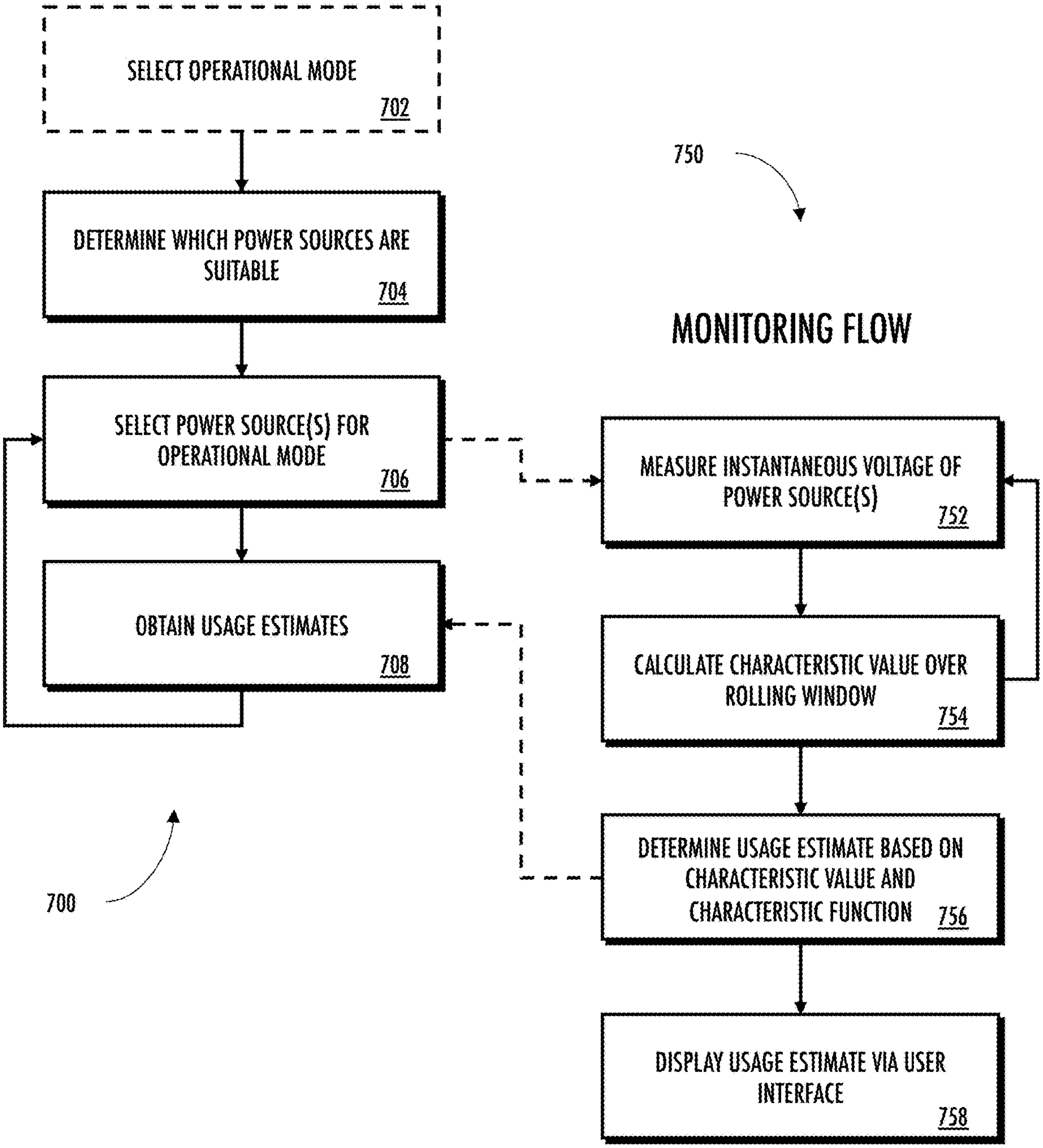
FIG. 7 illustrates logical flow diagrams of methods for power management and monitoring in accordance with the various techniques described herein.

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., power management instructions 700, and monitoring instructions 750 of FIG. 7) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of two separate processes, the processes may be combined into a single process or further subdivided into three or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the power management instructions 700, a user selects one or more operational modes from a plurality of operational modes (step 702). As previously noted, operational modes may include lighting modes, charging modes, data transfer/playback modes, and/or any other set of active functions. In some embodiments, the operational modes may be selected based on user selection. For example, a user may manually select between USB charging and/or lighting using switches, buttons, or other user interface components. In other embodiments, the operational modes may be selected based on the power management logic's internal heuristics and/or configuration.

For instance, the power management logic may automatically charge connected devices (e.g., the batteries, external devices), plugged devices (e.g., after USB enumeration procedures, etc.) and/or automatically enable/disable lighting based on motion activation, ambient light detection, etc. Accordingly, power management logic may determine the loads needing power including internal loads (e.g., a lighting assembly, indicator LEDs, processing/charging circuitry) and external loads (e.g., external sensors, external devices to charge or power, etc.). In some cases, the power management logic may prevent certain operational modes—for example, high current drain lighting may disable external charging, or with low remaining battery charge reduce the brightness of or disable certain types of lighting and/or vice versa.

Power management logic may include detecting and/or monitoring connected (or disconnected) loads. For example, an external device or sensor may be connected to the lighting system. A physical connection may be detected by various means. For example, the power management logic may detect electrical resistance on pins may be measured using a pull-down/pull-up resistor circuit. In a pull-down resistor circuit, a resistor is connected between an input pin (e.g., a charging contact) and the ground (GND) of a microcontroller of the power management logic. When a device is not connected, the resistor pulls the input pin to a logic low level (e.g., 0V or ground). This indicates the absence of a connection. When a device is connected, an external signal source (e.g., the connected device or a switch) overrides the pull-down resistor's effect, and the voltage at the input pin rises to a logic high level (in some examples, close to the supply voltage, e.g., 3.3V or 5V). In a pull-up resistor circuit, a resistor connects the input pin to the positive voltage. When no device is present, the pull-up resistor pulls the input pin to a logic high level (in some examples, close to the supply voltage, e.g., 3.3V or 5V). This indicates the absence of a connected device. When a device is connected, the external signal source (e.g., the connected device or a switch) overrides the pull-up resistor's effect, and the voltage at the input pin drops to a logic low level (e.g., close to ground).

Additional exemplary implementations may use one or more of the following mechanisms: a physical switch that is flipped when a device is connected, optical sensors that get covered when a device is connected, weight or pressure sensors detect a difference, a change in magnetic fields detected, a hall effect sensor detecting the presence/absence of a magnetic field (due to, e.g., a magnet in the connected device), etc.

At step 704, the power management logic determines a set of power sources that are suitable for the selected operational mode(s). Determining suitable power sources may include determining the kind, type, and/or charging status of available connected power sources. Power sources may include internal power sources (e.g., internal batteries, solar panels, etc.) or external power sources (e.g., connected devices like a power bank, etc.). Power sources may include, without limitation, dry cell batteries, rechargeable batteries, solar panels, hand-crank generator, fuel-based generators, fuel cells, piezo-electric cells, "mains" or "wall" power, and/or external power interfaces (e.g., USB, PoE), and/or any other source of electrical power.

In one embodiment, power management logic may be select between single-source or multiple source power supplies. As used herein, the term "single source" refers to a power supply that can select one power source from multiple power sources. For example, so-called "dual power" devices are devices that are designed to accept either single-use or rechargeable cells, but not at the same time. A dual power device may accept one battery cartridge for single-use batteries and another for rechargeable batteries. In another example, a single battery cartridge type can accept either single-use or rechargeable batteries (but not a mix of types). Dual power devices lack the onboard intelligence to manage different cell chemistries; thus, mixing cell types can result in the problems described above (reduced power, damage, and/or rupture). In some situations, dual power devices can also be inconvenient because the consumer may need to carry both options with them and to know in advance what their power needs will be.

As used herein, the term "multiple source" refers to a power supply that can combine power outputs from multiple power sources. For example, "hybrid power devices" may include circuitry that monitors power conditions of the different power sources and may make intelligent power management decisions on how to budget available power for a user of the device. Ideally, hybrid power devices can accommodate different power supplies, flexibly address different usages, and improve the convenience of use. For example, the exemplary lighting system 400 may combine output from multiple power sources (e.g., a solar panel and an internal rechargeable battery).

Various embodiments of the present disclosure may limit operational modes to certain suitable power sources. For example, suitable power draw may not be available from an on-device solar panel to power the needed lighting; supplemental current may be drawn from the rechargeable battery or the solar panel may be disabled. In another example, 3 AA or 3 D batteries can both generate up to 4.5V but at different current draws; thus, either power supply may be suitable for certain lighting modes. Similarly, external charging may preferentially use the 3.7V lithium-ion, with a fallback to 3 AA batteries. In some cases, suitability preferences may be used to prioritize/de-prioritize operational modes; for example, the exemplary lighting system 400 may preserve its internal battery when there is sufficient current available from the solar panel or when coupled to an external source of power via a USB-charging port. In some examples, the exemplary lighting system 400 may use certain power sources (e.g., the rechargeable battery) for high-intensity loads (e.g., certain lighting applications), devices (e.g., a device connected for charging) or interfaces (e.g., charging contacts), but not others. For example, charging a connected device via a USB interface. In other cases, suitability preferences may enable hybrid operation e.g., 4.5V can be concurrently sourced from AA and D cells without damage—but would result in harmful back current for the 3.7V lithium-ion. In some examples, a 4.5V load can be concurrently sourced from the internal battery and via a (power-in) USB interface. Some implementations may implement usage restrictions as static logic, other implementations may dynamically evaluate suitability based on a variety of factors. Examples of such factors may include e.g., minimum or maximum voltage/current/power requirements, user preferences, history of usage, battery condition, battery hysteresis (memory effects), availability of alternative power supplies, and/or any other operational consideration.

At step 706, the power management logic selects one or more power sources from the set of power sources for the operational mode. In one exemplary embodiment, the power management logic may select from multiple types of batteries and allow the batteries to be used separately, or concurrently. In another exemplary embodiment, the power management logic may select from powering device operations from connected power sources (e.g., via a USB power-in interface, a connected charging device, solar panels, etc.) and an internal battery and allow the various power sources to be used separately, or concurrently. The power management logic may intelligently monitor the availability of the power sources and the power remaining in all power sources; this information may be used to switch between the power sources. Ideally, the power management logic maximizes the power available for the lowest lifetime cost, while also offering the highest flexibility in power options.

For example, power management logic in the exemplary lighting system 400 may monitor available the available charge/battery life in the internal battery or an external battery pack to determine whether to continue to charge the internal battery (or, e.g., leave remaining power in the external battery to power/charge other, perhaps emergency, components like a cellular phone or headlamp). Determinations of the remaining charge may be provided via a data connection between devices or determined via the requested load.

At step 708, the power management logic obtains usage estimates from monitoring logic and may select (or re-select) another power source from the set of power sources for the selected operational mode. In some examples, usage estimates may be received from monitoring logic on a connected device.

Referring now to the monitoring instructions 750, the instantaneous voltage of a power source is measured at step

752. Voltage may be measured with a voltage sensor (described with respect to the sensor subsystem 410). In one exemplary embodiment, voltage may be measured across a known impedance using an analog-digital conversion (ADC). Impedance based measurements may consider both resistance (frequency independent) and/or reactance (frequency dependent). For example, certain duty cycles and/or sampling frequencies may use frequency-dependent resonance/interference to amplify and/or attenuate measurements. Then, the monitoring logic calculates a characteristic voltage for a rolling window at step 754.

As used herein, "instantaneous" refers to a specific measurement of a time-varying quantity at a specific time (an instance). "Characteristic" refers to a representative measurement for a time-varying quantity over a window of time. As previously noted, characteristic measurements may include averaging (mean, median, range), filtering, root-mean-square calculations, multiply-accumulate, and/or any other calculation that generates a characteristic non-zero value for a dynamic input.

In some embodiments, the granularity of the instantaneous measurements, the sample rate, and/or the size of the rolling window may be selected to provide a specific granularity. For example, a 4-bit ADC can generate up to 16 different values, an 8-bit ADC can generate up to 256 values. The sampling rate (e.g., 1 Hz (1/sec), 2 Hz (2/sec), . . . 40 Hz (40/sec), etc. affects the relative responsiveness of measurements. Accumulating these values over the rolling window could provide a substantial range of readings (e.g., accumulating 16 measurements could span 256-4096 different possible values over a duration between 200 ms-16 s). In some cases, the granularity may be specific to the operational mode. For example, a high-draw operational mode (e.g., 100% duty cycle light) will use battery power very quickly and may only need gross measurements at a relatively fast sample rate to detect the drop and/or rate of drop. In contrast, a low-draw operational mode (e.g., trickle charging) may need much finer granularity and/or a much slower sample rate to provide meaningful data. In other words, the monitoring logic may adjust its measurement accuracy/precision to suit the power consumption characteristics of the different operational modes.

At step 756, the monitoring logic determines usage estimates based on the characteristic value and a characteristic function. In one exemplary embodiment, the characteristic function may be a look-up table that provides a correspondence between a characteristic value (e.g., a time averaged voltage measurement taken at a specific duty cycle and sample rate) to an estimated battery life based on the experimentally determined battery chemistry/characteristics. More generally, however, any suitable function may be substituted with equal success. Characteristic functions may be based on piecewise, point-wise, linear approximation, polynomial interpolation, etc.

In some examples, usage estimates (and/or voltage/characteristic values) may be provided to a connected device. For example, the exemplary lighting system 400 may provide usage estimates of an internal battery to a connected battery pack when charging. The exemplary lighting system 400 may receive the characteristic value and/or receive the voltage/characteristic values and calculate the characteristic value over a rolling window for power management, monitoring, and/or display.

At step 758, the usage estimates are displayed via a user interface. Notably, indicator LEDs can represent different usage estimates based on the number lit and color. For example, the exemplary lighting system 400 may have four indicator LEDs to indicate the draw (or charging) of the state of the internal battery of the device. In another example, the exemplary lighting system 400 may have indicator LEDs to indicate the usage/remaining charge of each connected battery separately and/or connected external batteries based on receiving usage estimates from the external batteries. Other implementations may use any number of LEDs/colors to represent any number of different power information. More broadly, any scheme for representing usage may be substituted with equal success. For example, a sufficiently capable UI may provide usage estimates in more verbose or granular form e.g., a smart phone interface could provide a text readout with an estimated current draw (in amps/milliamps, etc.) and/or remaining capacity (amp hours, milliamp hours, etc.), or illustrate usage/capacity over time.

9.2 Operational Mode Selection

Figure 8:
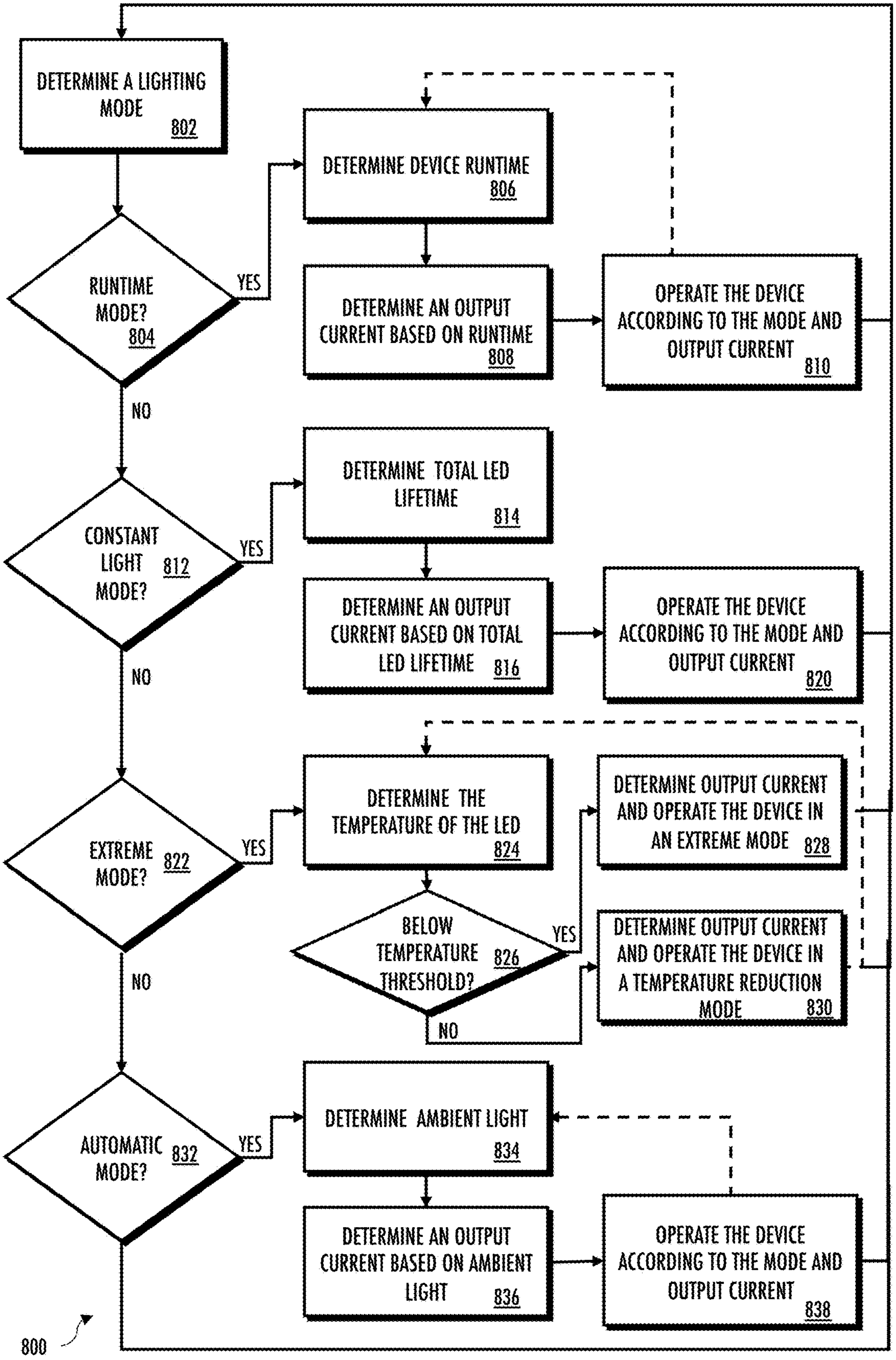
FIG. 8 is a logical flow diagram of a method for operational mode selection in accordance with the various techniques described herein.

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., operational mode selection instructions 800 of FIG. 8) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of a single process, the process may be separated into multiple processes (and performed by e.g., different subsystems of the exemplary lighting system 400) may be combined with other processes or further subdivided into two or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the operational mode selection instructions 800, the exemplary lighting system 400 must determine which lights to power, how much power to provide the lights/LEDs, and other usage settings, and for how long. The exemplary lighting system 400 may determine a lighting mode (at step 802). The lighting mode may be determined based on user input. For example, lighting modes may be determined based on determination of a gesture, a button press, turning of a dial, etc. or a combination of inputs.

The exemplary lighting system 400 may determine if the selected lighting mode is a runtime mode (at step 804). If the selected lighting mode is the runtime mode ("yes" branch), the exemplary lighting system 400 may determine the amount of runtime of the device (at step 806). Runtime mode may increase the potential runtime (e.g., preserve battery life) for a given lumen output, as defined by the FL-1 standard. A routine dimming of the LED over time (with its commensurate reduction in battery use) may cause the increased runtime. The lighting routine may maintain the brightness (lumen output) above a threshold value (e.g., 10% of the original lumen output as defined by the FL-1 standard). The exemplary lighting system 400 may determine the current device runtime by storing time the exemplary lighting system 400 was turned on when the device was turned on or the runtime mode was activated at mode activation. By subtracting the stored time from the current time, the runtime may be determined. The exemplary lighting system 400 may perform a lookup for an output current based on the determined runtime (at step 808). The exemplary lighting system 400 may be operated according to the selected runtime mode and output current (at step 810). In some examples, the exemplary lighting system will periodically determine the device runtime (at step 806) to alter the output current. When user input is detected, a lighting mode may be determined (at step 802).

If the selected lighting mode is not the runtime mode ("no" branch), the exemplary lighting system 400 may determine if the selected lighting mode is a constant lighting mode (at step 812). In some examples, the exemplary lighting system 400 has multiple constant lighting modes and which particular constant lighting mode (e.g., indoor lighting mode, outdoor lighting mode, up-close lighting mode, etc.) may be determined. Each constant lighting mode may be associated with a particular light output (lumen/lux) target. In some examples, the light output target is pre-selected/standardized across multiple devices. In other examples, the light output target has a default light output target but may be adjusted by a user.

If the selected lighting mode is a constant lighting mode ("yes" branch), the exemplary lighting system 400 may determine the total operating lifetime of the LED (at step 814). The exemplary lighting system 400 may store a counter, timer, or other value for the amount of time the LED assembly is operating. The counter may be incremented/augmented based on use of the LED. In some examples, the counter is augmented based on the amount of power provided/lumen output of the device. For example, when operated at less than full power/maximum light output the counter is incremented only a percentage of the total actual runtime proportionate to the power used/light output. The exemplary lighting system 400 may determine an output current based on the total LED lifetime (at step 816). Through use, an LED may become less efficient and produce less light output for a given energy/current input. The stored counter may be used by the exemplary lighting system 400 to estimate an output current for the LED to achieve the desired constant light output. The LED/exemplary lighting system 400 may be operated according to the mode and determined output current (at step 820). When user input is detected, a lighting mode may be determined (at step 802).

If the selected lighting mode is not a constant lighting mode (step 812, "no" branch), the exemplary lighting system 400 may determine if the selected lighting mode is an extreme lighting mode (at step 822). An extreme lighting mode may be characterized by a modulating light output based on the temperature of the LED of the exemplary lighting system 400. Above a certain threshold of light output the LED may output heat that may not be dissipated adequately for continuous operation at that light output. Heat above a certain limit may reduce the efficiency or useful life of the LED and exemplary lighting system 400. When a high temperature is detected, the device may operate in a temperature reduction mode characterized by a reduced light output. In this mode, the heat generated by the LED is less than the heat dissipated. After a certain period of time or after the temperature is reduced, the exemplary lighting system 400 may automatically return to extreme mode operation.

If the selected lighting mode is the extreme lighting mode ("yes" branch), the exemplary lighting system 400 may determine the temperature of the LED (at step 824). Periodically, temperature readings may be taken by a temperature sensor to determine the temperature of the LED or whether the temperature is below or above a threshold temperature. The exemplary lighting system 400 may determine whether the determined temperature is below (or above) a temperature threshold (at step 826). If the temperature of the LED is below the temperature threshold ("yes" branch), the exemplary lighting system 400 may determine an output current to operate the exemplary lighting system 400 in extreme mode (at step 828). In some examples, the exemplary lighting system will periodically determine the temperature of the LED (at step 824) to determine whether the extreme mode will be maintained. Otherwise, e.g., when user input is detected, a lighting mode may be determined (at step 802).

If the temperature of the LED is above the temperature threshold ("no" branch), the exemplary lighting system 400 may determine an output current to operate the exemplary lighting system 400 in a temperature reduction mode (at step 830) characterized by a lower lumen output than the extreme mode. In some examples, the exemplary lighting system will periodically determine the temperature of the LED (at step 824) to determine whether the extreme mode will be maintained. Otherwise, e.g., when user input is detected, a lighting mode may be determined (at step 802).

If the selected lighting mode is not the extreme lighting mode (step 822, "no" branch), the exemplary lighting system 400 may determine if the selected lighting mode is an automatic lighting mode (at step 832). In automatic lighting mode, the exemplary lighting system 400 may determine the light output based on the amount of ambient light. If the selected lighting mode is the automatic lighting mode ("yes" branch), the exemplary lighting system 400 may determine an ambient light (at step 834). Periodically, ambient light readings may be taken by an ambient light sensor. When ambient light is greater, the output lighting of the exemplary lighting system 400 may be set to a relatively higher amount so as to noticeably illuminate a target/surroundings/etc. When ambient light is less, the lighting output of the exemplary lighting system 400 may be set to a relatively lower value to illuminate a target/surroundings. The exemplary lighting system 400 may determine an output current to operate the exemplary lighting system 400 in the automatic mode based on the ambient light (at step 836). The LED/exemplary lighting system 400 may be operated according to the automatic mode and determined output current (at step 838). When user input is detected, a lighting mode may be determined (at step 802). In some examples, the exemplary lighting system will periodically determine the ambient light (at step 834) to determine whether the light output will be adjusted. Otherwise, e.g., when user input is detected, a lighting mode may be determined (at step 802).

In other examples, the automatic mode may be characterized by other or additional factors e.g., device motion, detected external motion, or the presence of a target. For example, light output may be based on the speed/velocity of the device. Device speed/velocity may be determined via, e.g., an inertial sensor/accelerometer. As the device speed/velocity increases, the light output may be increased (to increase the coverage of the flashlight). Conversely, as the device speed/velocity decreases, the light output may be reduced (to decrease the coverage of the flashlight).

In another example, device motion may determine whether to enter a standby mode. For example, where the exemplary lighting system 400 does not move for a particular period of time (e.g., 1 minute, 2 minutes, 5 minutes, etc.) (and/or where no other user input is detected) the exemplary lighting system 400 may automatically enter a standby mode or reduce light output of (or turn off) the LED. In standby mode, the exemplary lighting system may enter a low power or standby state. For example, the LED(s) and other loads may be powered off (or reduced in strength). Certain active sensors (e.g., microwave motion sensor, microphones/cameras, etc.) may be powered off. Other loads may remain active (ambient light sensor, microwave motion sensor, indicator lights, etc.) so the exemplary lighting system 400 may determine whether to "wake up" from the standby operational mode to a different/active operational mode.

In another example, a motion sensor may detect the presence of movement within a certain distance of the exemplary lighting system 400. The exemplary lighting system 400 may illuminate based on the movement detected (for a certain period of time before powering off) and may increase or decrease the light output based on the distance from the determined motion. In a further example, a proximity sensor may determine the distance to (and/reflectivity of) a target object (determined based on the object immediately in front of the LED assembly/in the beam of the LED of the exemplary lighting system 400). Lighting may be set higher/increased as the distance to the target object increases and set lower/decreased as the distance to the target object decreases.

In another example, the exemplary lighting system 400 may determine the power state of the device. The power state may include the remaining charge of the batteries or other power sources (via, e.g., a voltage detector). The power state may also include the charging status of a connected solar panel (whether and how much power is being received), whether the exemplary lighting system 400 is electrically coupled to an external/mains power, etc. If the battery is determined to have below a threshold amount of remaining power (either a constant value (e.g. 500 mAh) or a value relative to the maximum charge (e.g., 10%, 20%, etc. of the remaining charge)), the exemplary lighting system 400 may enter a low power mode or reduce the lighting to conserve battery power.

If the selected lighting mode is not the automatic lighting mode (step 832, "no" branch), the exemplary lighting system 400 may determine the lighting mode (at step 802).

10 Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the term "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processor" or "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A lighting apparatus, comprising:

one or more lighting devices;

a temperature sensor configured to detect a current temperature of at least one of the one or more lighting devices;

a controller; and a non-transitory computer-readable medium comprising instructions that when executed by the controller cause the lighting apparatus to:

determine the current temperature of at least one of the one or more lighting devices; and operate the one or more lighting devices based on a temperature reduction mode responsive to the current temperature is greater than a threshold temperature.

2. The lighting apparatus of claim 1, where the instructions, when executed by the controller, further cause the lighting apparatus to determine a lighting mode of a plurality of lighting modes, the plurality of lighting modes comprising a first lighting mode characterized by a heat output by the one or more lighting devices greater than a heat dissipation by the lighting apparatus, where determining the current temperature is based on the lighting mode.

3. The lighting apparatus of claim 2, where the plurality of lighting modes comprises the temperature reduction mode characterized by a second heat output by the one or more lighting devices less than the heat dissipation by the lighting apparatus.

4. The lighting apparatus of claim 1, where the instructions, when executed by the controller, further cause the lighting apparatus to periodically determine an updated temperature of the at least one of the one or more lighting devices based on the current temperature is greater than the threshold temperature.

5. The lighting apparatus of claim 4, where the instructions, when executed by the controller, further cause the lighting apparatus to:

determine the updated temperature is below the threshold temperature; and operate the one or more lighting devices based on an extreme output mode based on the updated temperature is below the threshold temperature, the extreme output mode characterized by a heat output by the one or more lighting devices greater than a heat dissipation by the lighting apparatus.

6. The lighting apparatus of claim 1, where the instructions, when executed by the controller, further cause the lighting apparatus to activate active cooling measures responsive to the current temperature is greater than the threshold temperature.

7. The lighting apparatus of claim 6, further comprising a fan, where activating the active cooling measures comprises activating the fan.

8. The lighting apparatus of claim 1, further comprising:

a head component, the head component comprising the one or more lighting devices; and a rotatable mode dial adjacent to the head component, the rotatable mode dial configured to indicate a user mode selection, where the instructions, when executed by the controller, further cause the lighting apparatus to determine the user mode selection based on a state of the rotatable mode dial.

9. A lighting apparatus, comprising:

one or more lighting devices;

a temperature sensor;

a controller; and a non-transitory computer-readable medium comprising instructions that when executed by the controller cause the lighting apparatus to:

determine a temperature of at least one of the one or more lighting devices via the temperature sensor;

select an output mode based on a comparison of the temperature and a threshold temperature; and operate the one or more lighting devices based on the output mode.

10. The lighting apparatus of claim 9, where:

selecting the output mode based on the temperature comprises selecting the output mode between a high output mode and a low output mode, operating the one or more lighting devices based on the high output mode causes the one or more lighting devices to generate more heat than can be dissipated during operation of the lighting apparatus to cause a temperature increase in the one or more lighting devices, and operating the one or more lighting devices based on the low output mode causes the one or more lighting devices to generate less heat than can be dissipated during operation of the lighting apparatus to cause a temperature decrease in the one or more lighting devices.

11. The lighting apparatus of claim 9, where:

selecting the output mode based on the temperature comprises selecting the output mode between a high output mode, a medium output mode, and a low output mode, a first light output of the one or more lighting devices when operating in the medium output mode is greater than a second light output of the one or more lighting devices when operating in the low output mode, and a third light output of the one or more lighting devices when operating in the high output mode is greater than the first light output of the one or more lighting devices when operating in the medium output mode.

12. The lighting apparatus of claim 9, where the instructions, when executed by the controller, further cause the lighting apparatus to determine one or more light output for one or more of the one or more lighting devices based on a function negatively proportional to the temperature.

13. The lighting apparatus of claim 9, where:

the instructions, when executed by the controller, further cause the lighting apparatus to determine a plurality of updated temperatures of the at least one of the one or more lighting devices, responsive to the temperature is greater than the threshold temperature.

14. The lighting apparatus of claim 13, where the instructions, when executed by the controller, further cause the lighting apparatus to:

determine the plurality of updated temperatures is below the threshold temperature for a threshold duration;

select an updated output mode based on the plurality of updated temperatures is below the threshold temperature for the threshold duration; and operate the one or more lighting devices based on the updated output mode.

15. The lighting apparatus of claim 13, where the instructions, when executed by the controller, further cause the lighting apparatus to:

determine at least a threshold number of the plurality of updated temperatures is below the threshold temperature;

select an updated output mode based on the threshold number of the plurality of updated temperatures is below the threshold temperature; and operate the one or more lighting devices based on the updated output mode.

16. A lighting apparatus, comprising:

one or more lighting devices;

a temperature sensor configured to detect a temperature of at least one of the one or more lighting devices;

a controller; and a non-transitory computer-readable medium comprising instructions that when executed by the controller cause the lighting apparatus to:

determine a lighting mode of a plurality of lighting modes, the plurality of lighting modes comprising a first lighting mode characterized by an initial light output that decreases over a first runtime of the lighting apparatus, a second lighting mode characterized by a substantially constant light output over a second runtime of the lighting apparatus, and a third lighting mode characterized by a modulating light output based on the temperature of the at least one of the one or more lighting devices; and operate the one or more lighting devices based on the lighting mode.

17. The lighting apparatus of claim 16, where the substantially constant light output is characterized by a light output during a majority of the second runtime is greater than 90% of a second initial light output.

18. The lighting apparatus of claim 16, where the instructions, when executed by the controller, further cause the lighting apparatus to determine a user mode selection, where determining the lighting mode is based on the user mode, selection.

19. The lighting apparatus of claim 16, where the instructions, when executed by the controller, further cause the lighting apparatus to:

determine a current temperature of the at least one of the one or more lighting devices via the temperature sensor responsive to determining the lighting mode comprises the third lighting mode; and select a light output for the at least one of the one or more lighting devices based on the current temperature.

20. The lighting apparatus of claim 19, where the instructions, when executed by the controller, further cause the lighting apparatus to:

determine an updated temperature of the at least one of the one or more lighting devices via the temperature sensor; and select an updated light output for the at least one of the one or more lighting devices based on the updated temperature.

* * * * *